United States Patent
Liu

(10) Patent No.: US 12,127,034 B2
(45) Date of Patent: Oct. 22, 2024

(54) METHOD FOR QOS CONTROL AND APPARATUS

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 406 days.

(21) Appl. No.: 17/721,350

(22) Filed: Apr. 14, 2022

(65) Prior Publication Data

US 2022/0240122 A1 Jul. 28, 2022

Related U.S. Application Data

(63) Continuation of application No. PCT/CN2020/076246, filed on Feb. 21, 2020.

(51) Int. Cl.
*H04W 28/02* (2009.01)
*H04B 17/309* (2015.01)
(Continued)

(52) U.S. Cl.
CPC ...... *H04W 28/0268* (2013.01); *H04B 17/309* (2015.01); *H04W 4/50* (2018.02); *H04W 84/042* (2013.01); *H04W 92/18* (2013.01)

(58) Field of Classification Search
CPC . H04W 28/0268; H04W 4/50; H04W 84/042; H04W 92/18; H04W 88/04; H04W 28/24; H04W 40/12; H04B 17/309
See application file for complete search history.

(56) References Cited

U.S. PATENT DOCUMENTS

| 2015/0063279 A1 | 3/2015 | Wang et al. |
| 2016/0286590 A1 | 9/2016 | Cheng et al. |

(Continued)

FOREIGN PATENT DOCUMENTS

| CN | 105207787 | 12/2015 |
| CN | 107535011 | 1/2018 |

(Continued)

OTHER PUBLICATIONS

IPI, Office Action for IN Application No. 202217021734, Oct. 18, 2022.

(Continued)

*Primary Examiner* — Kyaw Z Soe
(74) *Attorney, Agent, or Firm* — Hodgson Russ LLP

(57) ABSTRACT

A method for quality of service (QoS) control and an apparatus are provided. The method includes the following. A first terminal device receives first information provided by a second terminal device, where the first information includes an end-to-end QoS requirement of a service which is initiated by the second terminal device and to be communicated to a data network via the first terminal device. According to the end-to-end QoS requirement, the first terminal device obtains first QoS information of communication between the first terminal device and the second terminal device and second QoS information of communication between the first terminal device and the data network, where the end-to-end QoS requirement is satisfied by the first QoS information and the second QoS information.

20 Claims, 10 Drawing Sheets

(51) Int. Cl.
*H04W 4/50* (2018.01)
*H04W 84/04* (2009.01)
*H04W 92/18* (2009.01)

(56) References Cited

U.S. PATENT DOCUMENTS

| | | | |
|---|---|---|---|
| 2017/0041752 A1 | 2/2017 | Baek et al. | |
| 2018/0279319 A1 | 9/2018 | Yu et al. | |
| 2019/0335518 A1 | 10/2019 | Dimitrovski et al. | |
| 2019/0349951 A1 | 11/2019 | Ahmad | |
| 2021/0029723 A1* | 1/2021 | Wu | H04W 72/569 |
| 2022/0015107 A1* | 1/2022 | Li | H04W 72/543 |

FOREIGN PATENT DOCUMENTS

| | | |
|---|---|---|
| CN | 108366355 | 8/2018 |
| CN | 110169097 | 8/2019 |
| CN | 110366132 | 10/2019 |
| JP | 2018528684 | 9/2018 |
| WO | 2019196847 | 10/2019 |

OTHER PUBLICATIONS

EPO, Extended European Search Report for EP Application No. 20919810.0, Sep. 20, 2022.
Apple et al., "R17 Sidelink Relay," 3GPP TSG RAN Meeting #86, RP-193106 (revision of RP-192717), Dec. 2019.
WIPO, International Search Report for PCT/CN2020/076246, Nov. 27, 2020.
"3rd Generation Partnership Project; Technical Specification Group Services and System Aspects; Study on system enhancement for Proximity based Services (ProSe) in the 5G System (5GS) (Release 17)," 3GPP TR 23.752, Jan. 2020, v0.3.0.
"3rd Generation Partnership Project; Technical Specification Group Services and System Aspects; Proximity-based Services (ProSe); Stage 2 (Release 15)," 3GPP TS 23.303, Jun. 2018, v15.1.0.
Samsung et al., "ProSe Per Packet Priority assignment for MBMS traffic in UE2NW relay," 3GPP TSG-SA WG2 Meeting #110AH, S2-152873 (revision of S2-152830), Aug. 2015.
"3rd Generation Partnership Project; Technical Specification Group Services and System Aspects; Architecture enhancements for 5G System (5GS) to support Vehicle-to-Everything (V2X) services (Release 16)," 3GPP TS 23.287, Dec. 2019, v16.1.0.
"3rd Generation Partnership Project; Technical Specification Group Services and System Aspects; Study on system enhancement for Proximity based Services (ProSe) in the 5G System (5GS) (Release 17)," 3GPP TR 23.752, Jun. 2020, v0.4.0.
EPO, Communication for EP Application No. 20919810.0, Sep. 28, 2023.
Qualcomm Incorporated, "UE-to-UE Relay solution based on IP routing," SA WG2 Meeting #136AH, S2-2000573 (was S2-1911923), Jan. 2020.
Huawei et al., "QoS Aspects for the UE-to-NW Relay over Sidelink," 3GPP TSG RAN WG2 Meeting #95-bis, R2-166293, Oct. 2016.
CNIPA, Second Office Action for CN Application No. 202210466955.0, Aug. 4, 2023.
JPO, Office Action for JP Application No. 2022-540620, Sep. 19, 2023.
EPO, Communication for EP Application No. 20919810.0, May 11, 2023.
Samsung, "Key issue#3 update: to enable network controlled interactive service," SA WG2 Meeting #S2-136AH, S2-2000608, Jan. 2020.
CNIPA, First Office Action for CN Application No. 202210466955.0, May 18, 2023.
ISDEC, Office Action for CA Application No. 3163267, Jul. 31, 2023.
EPO, Communication for EP Application No. 20919810.0, Mar. 14, 2024.
ISDEC, Office Action for CA Application No. 3163267, May 21, 2024.

\* cited by examiner

METHOD FOR QOS CONTROL AND APPARATUS

CROSS-REFERENCE TO RELATED APPLICATION(S)

This application is a continuation of International Application No. PCT/CN2020/076246, filed Feb. 21, 2020, the entire disclosure of which is incorporated herein by reference.

TECHNICAL FIELD

Implementations of this disclosure relate to the field of communication technology, and particularly to a method for quality of service (QoS) control and an apparatus.

BACKGROUND

In 5th generation mobile networks (5G), in order to ensure end-to-end quality of service (QoS) of a service, the following scheme is proposed: a terminal device, which can interact with an external network (such as the internet, a private network of a certain industry or organization, etc.) through a 5G network and also has proximity-based services (ProSe) capability, is used as a relay terminal device, and other remote terminal devices having ProSe capability can establish a connection with the relay terminal device through a PC5 interface and establish a protocol data unit (PDU) session with the 5G network via the relay terminal device, so as to realize interaction with the external network.

However, in the above solution, how to configure respectively for the relay terminal device and the remote terminal device QoS parameters that satisfy a QoS requirement of a service is a problem to be solved.

SUMMARY

In a first aspect, a method for QoS control is provided in implementations of the disclosure. The method includes the following. A first terminal device receives first information from a second terminal device, where the first information includes an end-to-end QoS requirement of a service which is initiated by the second terminal device and to be communicated to a data network via the first terminal device. The first terminal device obtains first QoS information and second QoS information, where the first QoS information is QoS information of communication between the first terminal device and the second terminal device, the second QoS information is QoS information of communication between the first terminal device and the data network, and the end-to-end QoS requirement is satisfied by the first QoS information and the second QoS information.

In a second aspect, a method for QoS control is provided in implementations of the disclosure. The method includes the following. A second terminal device provides first information to a first terminal device, where the first information includes an end-to-end QoS requirement of a service which is initiated by the second terminal device and to be communicated to a data network via the first terminal device. The second terminal device receives first QoS information from the first terminal device, where the first QoS information is QoS information of communication between the first terminal device and the second terminal device.

In a third aspect, a method for QoS control is provided in implementations of the disclosure. The method includes the following. A first network device receives information used for determining second QoS information and provided by a first terminal device according to an end-to-end QoS requirement, where the end-to-end QoS requirement is an end-to-end QoS requirement of a service which is initiated by a second terminal device and to be communicated to a data network via the first terminal device. The first network device obtains the second QoS information according to the information used for determining the second QoS information, where the second QoS information is QoS information of communication between the first terminal device and the data network. The first network device provides information indicative of the second QoS information to the first terminal device.

In a fourth aspect, a terminal device is provided in implementations of the disclosure. The terminal device is a first terminal device. The terminal device includes a transceiver and a processor. The transceiver is configured to receive first information from a second terminal device, where the first information includes an end-to-end QoS requirement of a service which is initiated by the second terminal device and to be communicated to a data network via the first terminal device. The processor is configured to obtain first QoS information and second QoS information. The first QoS information is QoS information of communication between the first terminal device and the second terminal device, the second QoS information is QoS information of communication between the first terminal device and the data network, and the end-to-end QoS requirement is satisfied by the first QoS information and the second QoS information.

In a fifth aspect, a terminal device is provided in implementations of the disclosure. The terminal device is a second terminal device. The terminal device includes a transceiver and a processor. The transceiver is configured to provide first information to a first terminal device, where the first information includes an end-to-end QoS requirement of a service which is initiated by the second terminal device and to be communicated to a data network via the first terminal device. The transceiver is further configured to receive first QoS information from the first terminal device. The processor is configured to obtain the first QoS information from information received. The first QoS information is QoS information of communication between the first terminal device and the second terminal device.

In a sixth aspect, a network device is provided in implementations of the disclosure. The network device is a first network device. The network device includes a transceiver and a processor. The transceiver is configured to receive information used for determining second QoS information and provided by a first terminal device according to an end-to-end QoS requirement, where the end-to-end QoS requirement is an end-to-end QoS requirement of a service which is initiated by a second terminal device and to be communicated to a data network via the first terminal device. The processor is configured to obtain the second QoS information according to the information used for determining the second QoS information, where the second QoS information is QoS information of communication between the first terminal device and the data network. The transceiver is further configured to provide information indicative of the second QoS information to the first terminal device.

BRIEF DESCRIPTION OF THE DRAWINGS

In order to describe more clearly technical solutions of implementations of the disclosure or the related art, the following will give a brief introduction to the accompanying drawings used for describing the implementations or the related art. Apparently, the accompanying drawings described below are some implementations of the disclosure. Based on these drawings, those of ordinary skill in the art can also obtain other drawings without creative effort.

DETAILED DESCRIPTION

In order to make purposes, technical solutions, and advantages of implementations of the disclosure clearer, the following will describe clearly and comprehensively the technical solutions of implementations of the disclosure with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The terms "first", "second", and the like used in the specification, the claims, and the accompany drawings described above of implementations of the disclosure are used to distinguish similar objects rather than describe a particular order or sequence. In addition, the terms "include", "comprise", and "have" as well as variations thereof are intended to cover non-exclusive inclusion. For example, a process, method, system, product, or device including a series of steps or units is not limited to the listed steps or units, instead, it can optionally include other steps or units that are not listed, or other steps or units inherent to the process, method, product, or device can also be included.

Figure 1:
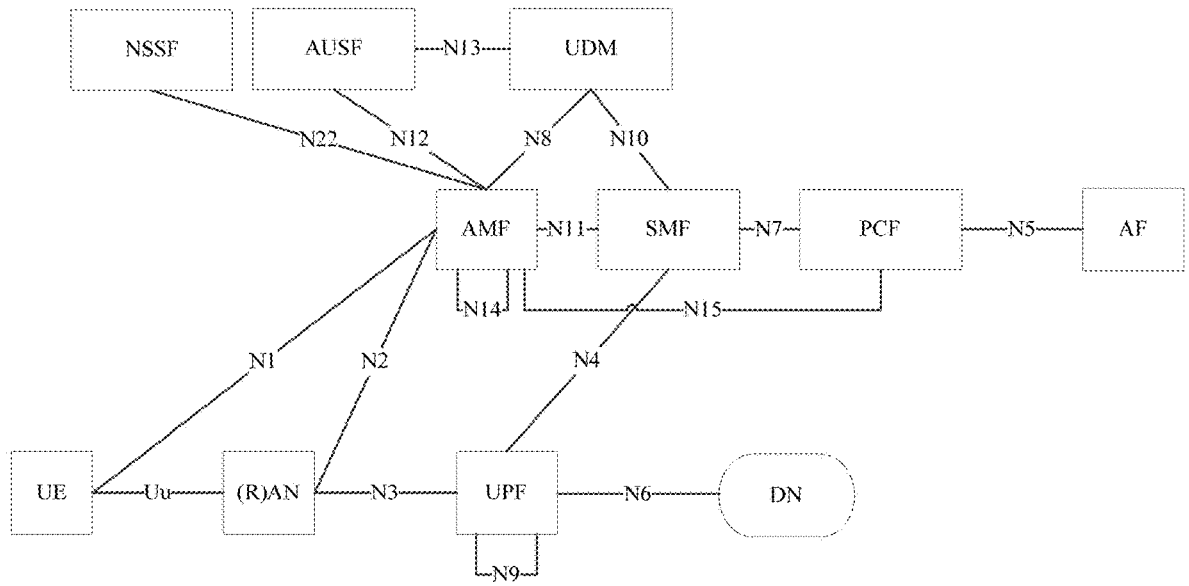
FIG. 1 is a schematic diagram of a 5$^{th}$ generation (5G) network architecture provided in the disclosure.

FIG. 1 is a schematic diagram of a 5$^{th}$ generation (5G) network architecture provided in the disclosure. In the 5G network illustrated in FIG. 1, a user equipment (UE) establishes an access stratum connection with an access network (AN) through a Uu interface, to exchange access stratum messages and perform wireless data transmission. The UE establishes a none access stratum (NAS) connection with an access and mobility management function (AMF) through N1 interface, to exchange NAS messages. The AMF is a mobility management function in a core network. A session management function (SMF) is a session management function in the core network. In addition to mobility management of the UE, the AMF is further used for forwarding session management related messages between the UE and the SMF. A policy control function (PCF) is a policy control function in the core network and is used for specifying policies related to mobility management, session management, charging, etc. of the UE. A user plane function (UPF) is a user plane function in the core network. The UPF performs data transmission with an external network through N6 interface. The UPF is further used for data transmission with the AN through N3 interface. A data network (DN) in FIG. 1 represents a data network. The DN may be the external network. In some cases, the external network may also be other names such as external data network, target network, target data network, etc.

After accessing the 5G network through the Uu interface, under control of the SMF, the UE establishes a protocol data unit (PDU) session in order for data transmission. In case of deployment of the PCF by an operator, the SMF obtains a policy and charging control (PCC) rule from the PCF, and determines, according to the PCC rule, a quality of service (QoS) rule for the UE to perform data transmission. The SMF provides the determined QoS rule to the UE via the AMF.

Take a video transmission service as an example. If the PCF determines that a requirement on end-to-end data transmission delay of the service of the UE is 200 ms (millisecond), a requirement on data transmission delay specified by the QoS rule received by the UE is 200 ms. It is to be noted that, the requirement on data transmission delay specified by the QoS rule herein is a requirement on data transmission delay between the UE and the UPF.

Figure 2:
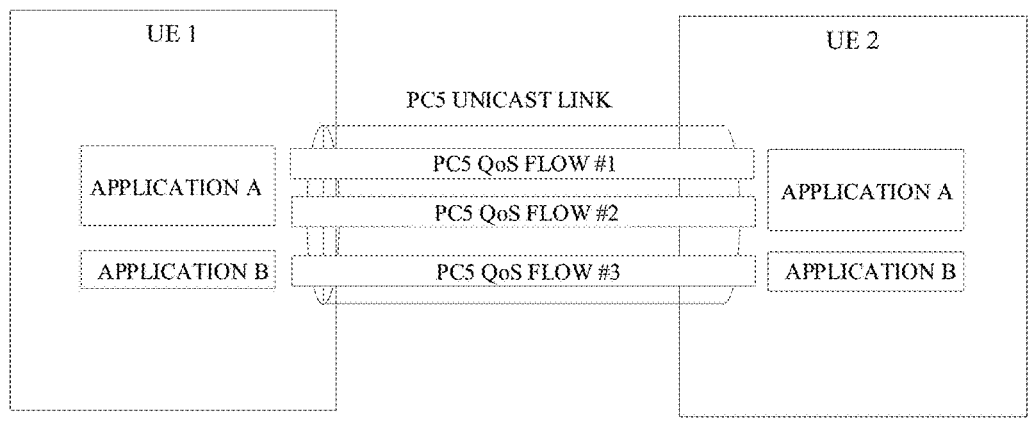
FIG. 2 is a schematic architectural diagram of PC5 unicast link based communication provided in the disclosure.

FIG. 2 is a schematic architectural diagram of PC5 link based communication provided in the disclosure. In the scenario illustrated in FIG. 2, UE 1 and UE 2 both have proximity-based services (ProSe) capability, and PC5 unicast link direct communication can be established between UE 1 and UE 2 through a PC5 interface. Different service data flows have different QoS requirements, and transmission can be performed through different QoS flows. UE 1 and UE 2 each generate a PC5 QoS rule and a corresponding QoS parameter according to a QoS requirement of a service, thereby ensuring data transmission quality of the service in communication on a PC5 link.

Exemplarily, when UE 1 and UE 2 exchange a video transmission service through ProSe direct communication, UE 1 and UE 2 each determine, according to an application layer identity (ID) obtained from an application layer, that a requirement on data transmission delay corresponding to the PC5 QoS rule is 200 ms. It is to be noted that, the requirement on data transmission delay referred to herein is a requirement on data transmission delay of direct transmission between UE 1 and UE 2.

Figure 3:
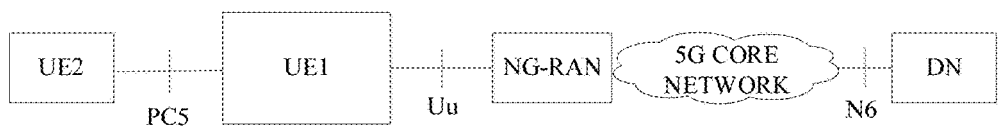
FIG. 3 is a diagram of a communication scenario provided in the disclosure.

Based on the above illustration, in connection with the scenario illustrated in FIG. 3, if a UE, such as UE 1, is capable of interacting with a data network through a 5G network and also has ProSe capability, the UE can act as a relay node. Another UE having ProSe capability, such as UE 2, can establish a direct connection with UE 1 that acts as the relay node through the PC5 interface and establish a PDU session with the 5G network via UE 1, so as to interact with the data network.

However, in the service scenario illustrated in FIG. 3, if UE 1 and UE 2 each generate a PC5 QoS rule and a corresponding QoS parameter according to a QoS requirement of a service of an application layer based on a conventional manner, a QoS rule between UE 1 and a UPF that is obtained by UE 1 in the above manner illustrated in FIG. 1 may fail to satisfy an end-to-end QoS requirement of a service which is initiated by UE 2 and as a result, it is hard to satisfy service requirements of a user. For example, for interaction of a video transmission service of which a requirement on end-to-end data transmission delay is 200 ms, a PCF controls a transmission delay from UE 1 to the data network to be 200 ms according to the service requirement, and a transmission delay on the PC5 interface determined by UE 2 and UE 1 according to the service requirement is also 200 ms. Then an actual transmission delay of the service is a sum of the 200 ms transmission delay from UE 2 to UE 1 and the 200 ms transmission delay from UE 1 to the data network, that is, the actual transmission delay of the service is 400 ms. In this case, it is hard to satisfy a service requirement of UE 2.

Implementations of the disclosure provide a method for QoS control, to solve problems in the related art. Before introducing the method for QoS control provided in implementations, an implementation environment involved in implementations of the disclosure will be first introduced.

The technical solutions of implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems, etc.

Generally speaking, a conventional communication system supports a limited number of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, a vehicle to everything (V2X) system, etc. Implementations of the disclosure can also be applied to these communication systems.

It is to be noted that, the system architectures and service scenarios described in implementations of the disclosure are intended for describing the technical solutions of implementations of the disclosure more clearly, and do not constitute limitation on the technical solutions provided in implementations of the disclosure. Those of ordinary skill in the art can appreciate that, with evolution of network architectures and emergence of new service scenarios, for similar technical problems, the technical solutions provided in implementations of the disclosure are also applicable.

Figure 4:
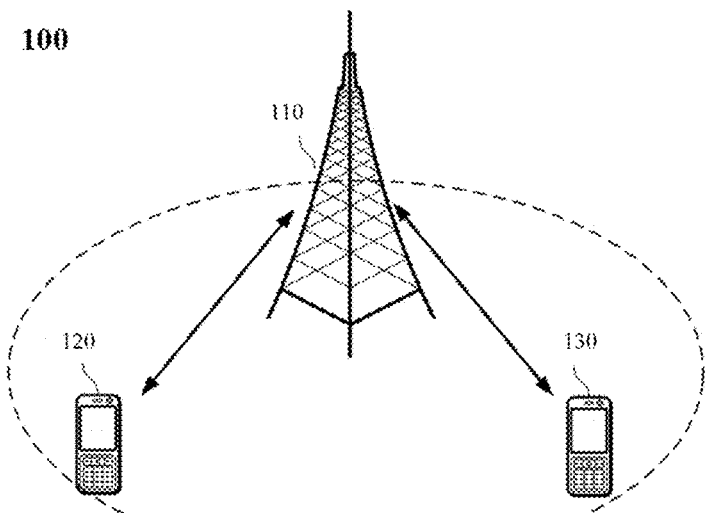
FIG. 4 is a schematic architectural diagram of a communication system to which the disclosure can be applied.

FIG. 4 is an architectural diagram of a communication system to which the disclosure can be applied. The communication system 100 illustrated in FIG. 4 includes a network device 110, a first terminal device 120, and a second terminal device 130.

The network device 110 may be a device that can communicate with the first terminal device 120 (or referred to as first communication terminal, first terminal, first UE, or other names). In some cases, the network device 110 may also communicate with the second terminal device 130 (or referred to as second communication terminal, second terminal, second UE, or other names). The network device 110 can provide a communication coverage for a specific geographical area and communicate with terminals in the coverage area. Optionally, the network device 110 may be an evolutional Node B (eNB or eNodeB) in an LTE system, or may be a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future communication system, etc.

As to the first terminal device 120 and the second terminal device 130, the "terminal" used herein includes but is not limited to a device configured to communicate via a wired line, another data connection/network, a wireless interface, a device which is part of another terminal and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal configured to communicate via a wireless interface may be called a "wireless communication terminal", a "wireless terminal", or a "mobile terminal". Examples of the mobile terminal include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, a conventional laptop and/or a handheld receiver, or other electronic devices equipped with radio telephone transceiver. The terminal device may refer to an access terminal, a UE, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal in a 5G network, a terminal in a future evolved public land mobile network (PLMN), etc.

Optionally, the first terminal device 120 and the second terminal device 130 can communicate with each other through D2D communication. Optionally, the second terminal device 130 can communicate with the network device via the first terminal device 120, or the first terminal device 120 can communicate with the network device via the second terminal device 130. It can be understood that, the first terminal device and the second terminal device referred to herein are relative and do not limit an order of terminal devices.

Optionally, a 5G communication system or 5G network can also be referred to as an NR system or NR network.

FIG. 4 exemplarily illustrates one network device and two terminal devices.

Optionally, the communication system 100 may also include multiple network devices, and there can be other numbers of terminal devices in a coverage area of each of the network devices. Implementations of the disclosure are not limited in this regard.

Optionally, the communication system 100 may further include other network entities such as a network controller, a mobile management entity, a PCF, an SMF, or the like, and implementations of the disclosure are not limited in this regard.

It should be understood that, in implementations of the disclosure, a device with communication functions in a network/system can be referred to as a "communication device". Taking the communication system 100 illustrated in FIG. 4 as an example, the communication device may include the network device 110, the first terminal device 120, and the second terminal device 130 that have communication functions. The network device 110 and the terminal devices can be the devices described above and will not be repeated herein. The communication device may further include other devices such as a network controller, a mobile management entity, or other network entities in the communication system 100, and implementations of the disclosure are not limited in this regard.

The following will describe in detail a method for QoS control provided in implementations of the disclosure. The method for QoS control provided in the disclosure includes at least some of the following.

Figure 5:
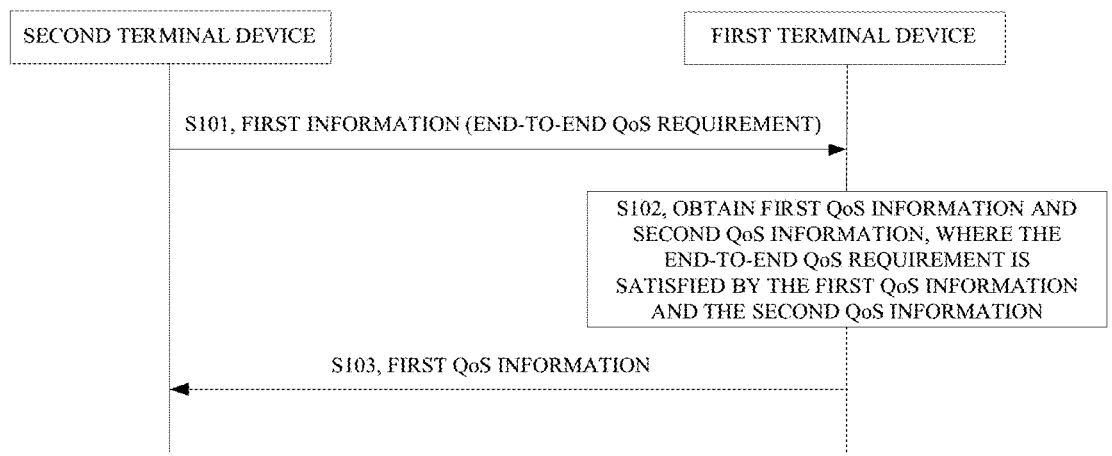
FIG. 5 is a flowchart of a method for quality of service (QoS) control provided in an implementation of the disclosure.

FIG. 5 is a flowchart of a method for QoS control provided in an implementation of the disclosure. As illustrated in FIG. 5, the method in this implementation includes the following.

S101, a second terminal device provides (such as transmits) first information to a first terminal device.

Accordingly, the first terminal device receives the first information provided by the second terminal device. The first information includes an end-to-end QoS requirement of a service which is initiated by the second terminal device and to be communicated to a data network via the first terminal device.

In this scheme, the first terminal device is capable of communication with the data network and direct communication with the second terminal device. The second terminal device is capable of direct communication with the first terminal device. The first terminal device can act as an intermediate node used for communication between the second terminal device and the data network, that is, the second terminal device can communicate with the data network via the first terminal device.

Optionally, the first information further includes an ID of the service which is initiated by the second terminal device and/or an ID of the second terminal device.

S102, the first terminal device obtains first QoS information and second QoS information.

In this scheme, the first QoS information is QoS information of communication between the first terminal device and the second terminal device. The second QoS information is QoS information of communication between the first terminal device and the data network. The end-to-end QoS requirement is satisfied by the first QoS information and the second QoS information obtained by the first terminal device.

The first QoS information may include a QoS parameter. The QoS parameter includes, but is not limited to, one or more of a transmission delay, a bit error rate, a bandwidth, etc. The first QoS information may also be other names such as first QoS rule, first QoS parameter, first parameter, etc. Implementations of the disclosure are not limited in this regard.

The second QoS information may include a QoS parameter. The QoS parameter includes, but is not limited to, one or more of a transmission delay, a bit error rate, a bandwidth, etc. The second QoS information may also be other names such as second QoS rule, second QoS parameter, second parameter, etc. Implementations of the disclosure are not limited in this regard.

Exemplarily, the first terminal device may obtain the first QoS information and the second QoS information in the following manners.

In a possible implementation, the first terminal device can transmit to a network device the end-to-end QoS requirement of the service which is initiated by the second terminal device, and the network device configures the first QoS information and the second QoS information respectively according to the end-to-end QoS requirement. If the first information includes the ID of the service which is initiated by the second terminal device and/or the ID of the second terminal device, the first terminal device can further transmit the ID of the service and/or the ID of the second terminal device to the network device, such that the network device configures the first QoS information and the second QoS information according to the end-to-end QoS requirement as well as the ID of the service and/or the ID of the second terminal device.

In another possible implementation, according to the end-to-end QoS requirement received, the first terminal device requests a network device to configure the second QoS information. Then the first terminal device can obtain the first QoS information according to the end-to-end QoS requirement and the second QoS information configured by the network device. If the first information includes the ID of the service which is initiated by the second terminal device and/or the ID of the second terminal device, the first terminal device can further transmit the ID of the service and/or the ID of the second terminal device to the network device, such that the network device can consider influence on the service and the second terminal device when configuring the second QoS information.

In another possible implementation, the first terminal device determines a first QoS requirement and a second QoS requirement respectively according to the end-to-end QoS requirement of the service which is initiated by the second terminal device. The first QoS requirement referred to herein is a QoS requirement of communication between the first terminal device and the second terminal device determined by the first terminal device according to the end-to-end QoS requirement. The second QoS requirement is a QoS requirement of communication between the first terminal device and the data network determined by the first terminal device according to the end-to-end QoS requirement. The first terminal device provides the first QoS requirement and the second QoS requirement to a network device and requests authorization from the network device. The first terminal device obtains the first QoS information and the second QoS information according to authorization information of the network device.

In practice, the manner in which the first terminal device obtains the first QoS information and the second QoS information is however not limited to the manners described above.

In this implementation, the first terminal device first receives the first information provided by the second terminal device, where the first information includes the end-to-end QoS requirement of the service which is initiated by the second terminal device and to be communicated to the data network via the first terminal device. According to the QoS requirement, the first terminal device obtains the first QoS information of communication between the first terminal device and the second terminal device and the second QoS information of communication between the first terminal device and the data network, where the end-to-end QoS requirement of the service is satisfied by the first QoS information and the second QoS information. According to the method in this implementation, it is possible to configure for the first terminal device the second QoS information that satisfies the end-to-end QoS requirement of the service, thereby ensuring a QoS of the service which is initiated by the second terminal device.

In some implementations, the method may further include the following after S102.

S103, the first terminal device provides the first QoS information to the second terminal device. Accordingly, the second terminal device receives the first QoS information from the first terminal device.

The first terminal device provides the first QoS information to the second terminal device, and it is possible to configure for the second terminal device the first QoS information that satisfies the end-to-end QoS requirement of the service, thereby ensuring a QoS of the service which is initiated by the second terminal device.

According to the method in implementations of the disclosure, it is possible to configure for the first terminal device the second QoS information that satisfies the end-to-end QoS requirement of the service, thereby ensuring a QoS of the service which is initiated by the second terminal device. In addition, the first terminal device provides the first QoS information to the second terminal device, such that the second terminal device obtains the first QoS information, and as such, it is possible to configure for the second terminal device the first QoS information that satisfies the end-to-end QoS requirement of the service, thereby ensuring a QoS of the service which is initiated by the second terminal device.

Based on the foregoing implementations, the first terminal device can obtain the first QoS information and the second QoS information in various manners, which will be elaborated below with reference to specific implementations.

Figure 6:
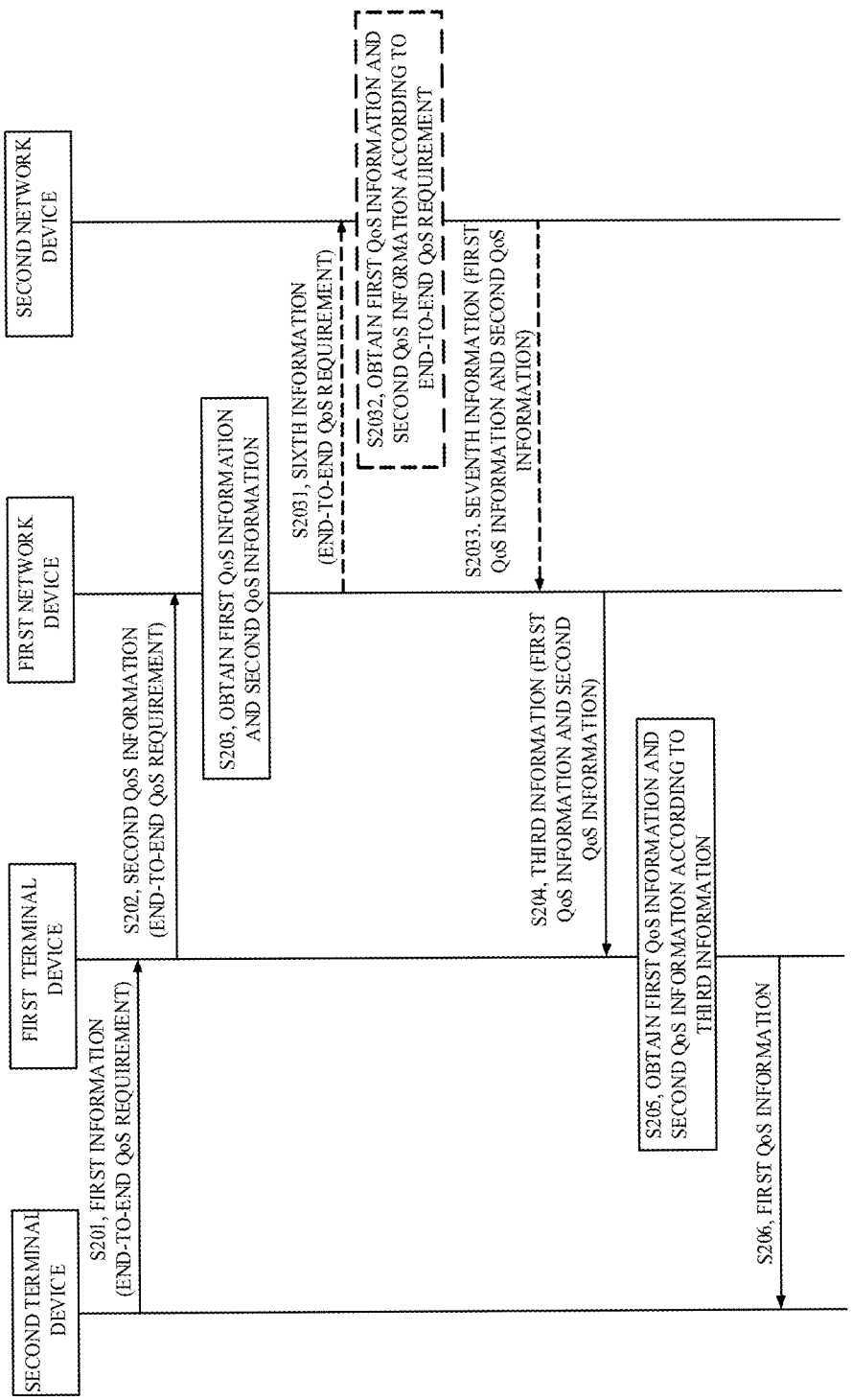
FIG. 6 is a flowchart of a method for QoS control provided in another implementation of the disclosure.

FIG. 6 is a flowchart of a method for QoS control provided in another implementation of the disclosure. As illustrated in FIG. 6, the method in this implementation includes the following.

S201, the second terminal device provides the first information to the first terminal device.

S201 in this implementation is similar to S101 in the implementation illustrated in FIG. 5. Reference can be made to elaborations of S101 in the implementation illustrated in FIG. 5, which will not be elaborated again herein.

S202, the first terminal device provides second information to a first network device.

Accordingly, the first network device receives the second information from the first terminal device. In this step, the second information is used for requesting to determine the first QoS information and the second QoS information. The second information may include the end-to-end QoS requirement of the service which is initiated by the second terminal device and to be communicated to the data network via the first terminal device.

Optionally, the second information further includes the ID of the service and/or the ID of the second terminal device. The ID of the service is used for determining the first QoS information and the second QoS information, and the ID of the second terminal device is used for determining the first QoS information and the second QoS information.

S203, the first network device obtains the first QoS information and the second QoS information according to the second information.

In a possible implementation, the first network device can obtain the first QoS information and the second QoS information according to the end-to-end QoS requirement and a pre-configured QoS control policy. If the second information further includes the ID of the service and/or the ID of the second terminal device, the first network device can determine the first QoS information and the second QoS information according to the end-to-end QoS requirement, the pre-configured QoS control policy, and the ID of the service and/or the ID of the second terminal device.

In another possible implementation, if a second network device that is responsible for policy control is deployed, the second network device can determine the first QoS information and the second QoS information according to the end-to-end QoS requirement and a pre-configured QoS control policy, and transmit the first QoS information and the second QoS information determined to the first network device. If the second information further includes the ID of the service and/or the ID of the second terminal device, the first network device can also transmit the ID of the service and/or the ID of the second terminal device to the second network device, such that the second network device determines the first QoS information and the second QoS information according to the end-to-end QoS requirement, the pre-configured QoS control policy, and the ID of the service and/or the ID of the second terminal device.

If the first QoS information and the second QoS information are determined by the second network device, S2031~S2033 are performed after S202.

S2031, the first network device provides sixth information to the second network device. Accordingly, the second network device receives the sixth information from the first network device.

In this step, the sixth information provided by the first network device to the second network device is used for requesting to determine the first QoS information and the second QoS information. The sixth information may include the end-to-end QoS requirement of the service.

Optionally, the sixth information further includes the ID of the service and/or the ID of the second terminal device.

S2032, the second network device determines the first QoS information and the second QoS information according to the end-to-end QoS requirement.

Specifically, the second network device determines the first QoS information and the second QoS information according to the end-to-end QoS requirement of the service and a pre-configured QoS control policy. If the sixth information further includes an ID of the service and/or an ID of the second terminal device, the second network device determines the first QoS information and the second QoS information according to the end-to-end QoS requirement, the pre-configured QoS control policy, and the ID of the service and/or the ID of the second terminal device.

S2033, the second network device provides seventh information to the first network device. Accordingly, the first network device receives the seventh information provided by the second network device and obtains the first QoS information and the second QoS information from the seventh information.

The seventh information may include the first QoS information and the second QoS information, or the seventh information may include indication information of the first QoS information and indication information of the second QoS information.

It is to be noted that, the pre-configured QoS control policy involved in implementations may be determined by an operator according to factors such as service type, transmission resource, user priority, etc. There is no limitation on the pre-configured QoS control policy in implementations of the disclosure. In other words, there is no limitation on the manner in which the first network device or the second network device determines the first QoS information and the second QoS information in implementations of the disclosure.

S204, the first network device provides third information to the first terminal device. Accordingly, the first terminal device receives the third information from the first network device.

The third information includes the first QoS information and the second QoS information, or the third information includes indication information of the first QoS information and indication information of the second QoS information.

S205, the first terminal device obtains the first QoS information and the second QoS information according to the third information.

In this implementation, the first terminal device first receives the first information provided by the second terminal device, where the first information includes the end-to-end QoS requirement of the service which is initiated by the second terminal device and to be communicated to the data network via the first terminal device. According to the end-to-end QoS requirement, the first terminal device provides the first network device the second information including the end-to-end QoS requirement. According to the end-to-end QoS requirement, the first network device obtains and provides the first QoS information of communication between the first terminal device and the second terminal device and the second QoS information of communication between the first terminal device and the data network. The first terminal device obtains the first QoS information and the second QoS information, where the end-to-end QoS requirement of the service is satisfied by the first QoS information and the second QoS information. According to the method in this implementation, it is possible to configure for the first terminal device the second QoS information that satisfies the end-to-end QoS requirement of the service, thereby ensuring a QoS of the service which is initiated by the second terminal device.

In some implementations, optionally, the method may further include the following after S205.

S206, the first terminal device provides the first QoS information to the second terminal device.

The first terminal device provides the first QoS information to the second terminal device, and it is possible to configure for the second terminal device the first QoS information that satisfies the end-to-end QoS requirement of the service, thereby ensuring a QoS of the service which is initiated by the second terminal device.

Figure 7:
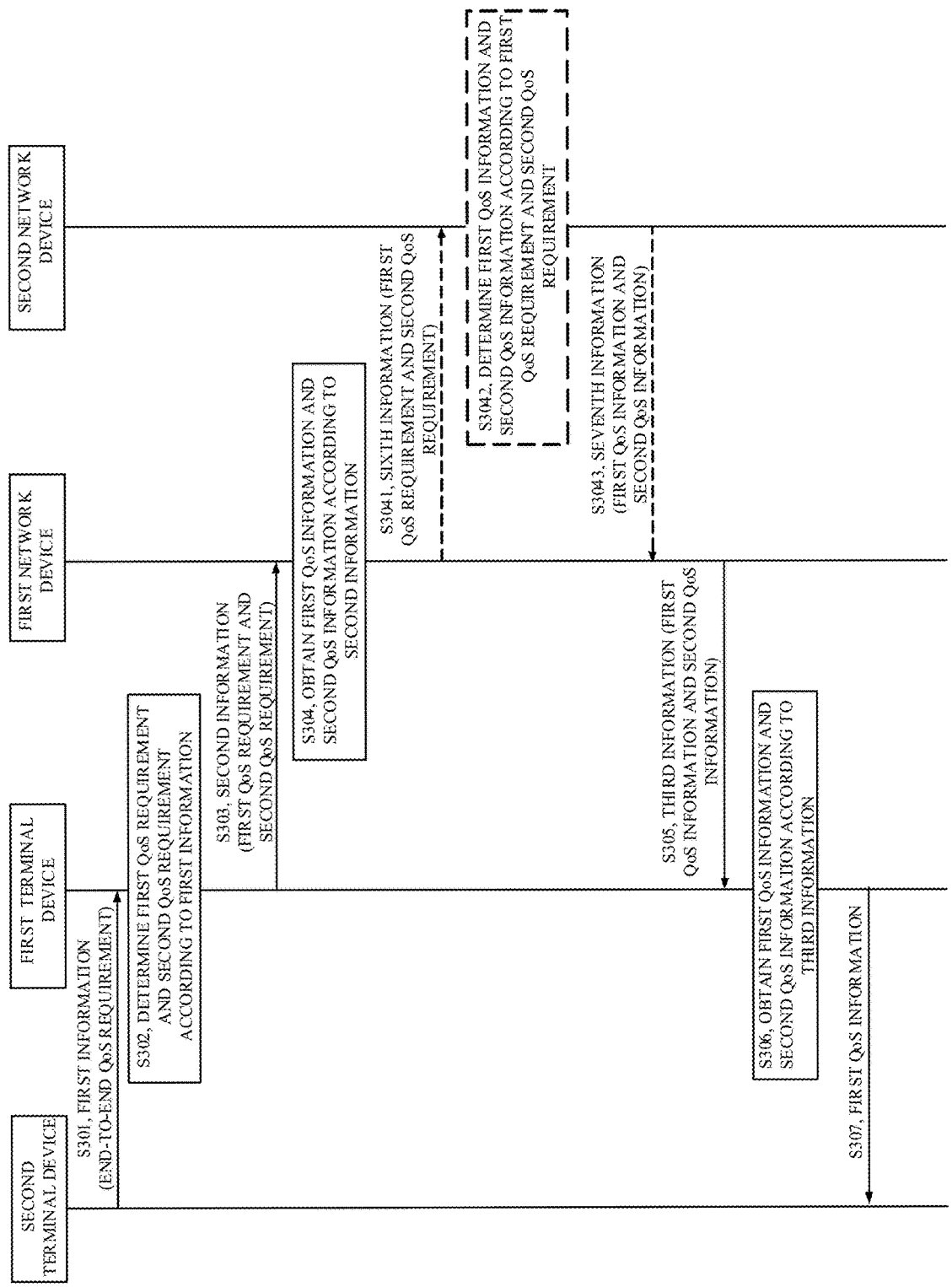
FIG. 7 is a flowchart of a method for QoS control provided in another implementation of the disclosure.

FIG. 7 is a flowchart of a method for QoS control provided in another implementation of the disclosure. As illustrated in FIG. 7, the method in this implementation includes the following.

S301, the second terminal device provides the first information to the first terminal device.

S301 in this implementation is similar to S101 in the implementation illustrated in FIG. 5. Reference can be made to elaborations of S101 in the implementation illustrated in FIG. 5, which will not be elaborated again herein.

S302, the first terminal device determines the first QoS requirement and the second QoS requirement according to the first information.

The first QoS requirement is a QoS requirement of communication between the first terminal device and the second terminal device determined by the first terminal device according to the end-to-end QoS requirement. The second QoS requirement is a QoS requirement of communication between the first terminal device and the data network determined by the first terminal device according to the end-to-end QoS requirement. It is to be noted that, the end-to-end QoS requirement is satisfied by the first QoS requirement and the second QoS requirement.

S303, the first terminal device provides second information to a first network device.

Accordingly, the first network device receives the second information from the first terminal device. In this step, the second information is used for requesting to determine the first QoS information and the second QoS information. The second information may include the first QoS requirement and the second QoS requirement that are determined by the first terminal device according to the end-to-end QoS requirement.

S304, the first network device obtains the first QoS information and the second QoS information according to the second information.

In a possible implementation, the first network device can obtain the first QoS information and the second QoS information according to the first QoS requirement and the second QoS requirement as well as a pre-configured QoS control policy. If the first network device determines, according to the first QoS requirement and the second QoS requirement as well as the pre-configured QoS control policy, that the first QoS requirement and the second QoS requirement can be authorized, the first QoS information obtained is the first QoS requirement, and the second QoS information obtained is the second QoS requirement.

In another possible implementation, if a second network device that is responsible for policy control is deployed, the second network device can determine the first QoS information and the second QoS information according to the first QoS requirement and the second QoS requirement as well as a pre-configured QoS control policy, and transmit the first QoS information and the second QoS information determined to the first network device.

If the first QoS information and the second QoS information are determined by the second network device, S3041~S3043 are performed after S303.

S3041, the first network device provides sixth information to the second network device. Accordingly, the second network device receives the sixth information from the first network device.

In this step, the sixth information provided by the first network device to the second network device is used for requesting to determine the first QoS information and the second QoS information. The sixth information may include the first QoS requirement and the second QoS requirement.

S3042, the second network device determines the first QoS information and the second QoS information according to the first QoS requirement and the second QoS requirement.

Specifically, the second network device determines the first QoS information and the second QoS information according to the first QoS requirement and the second QoS requirement as well as the pre-configured QoS control policy.

S3043, the second network device provides seventh information to the first network device. Accordingly, the first network device receives the seventh information provided by the second network device, and obtains the first QoS information and the second QoS information from the seventh information.

The seventh information may include the first QoS information and the second QoS information, or the seventh information may include indication information of the first QoS information and indication information of the second QoS information.

It is to be noted that, the pre-configured QoS control policy involved in implementations may be determined by an operator according to factors such as service type, transmission resource, user priority, etc. There is no limitation on the pre-configured QoS control policy in implementations of the disclosure. In other words, there is no limitation on the manner in which the first network device or the second network device determines the first QoS information and the second QoS information in implementations of the disclosure.

S305, the first network device provides third information to the first terminal device. Accordingly, the first terminal device receives third information from the first network device.

The third information includes the first QoS information and the second QoS information, or the third information includes indication information of the first QoS information and indication information of the second QoS information.

S306, the first terminal device obtains the first QoS information and the second QoS information according to the third information.

In this implementation, the first terminal device first receives the first information provided by the second terminal device, where the first information includes the end-to-end QoS requirement of the service which is initiated by the second terminal device and to be communicated to the data network via the first terminal device. According to the end-to-end QoS requirement, the first terminal device provides the first network device the sixth information including the first QoS requirement and the second QoS requirement. According to the first QoS requirement and the second QoS requirement, the first network device obtains and provides the first QoS information of communication between the first terminal device and the second terminal device and the second QoS information of communication between the first terminal device and the data network. The first terminal device obtains the first QoS information and the second QoS information, where the end-to-end QoS requirement of the service is satisfied by the first QoS information and the second QoS information. According to the method in this implementation, it is possible to configure for the first terminal device the second QoS information that satisfies the end-to-end QoS requirement of the service, thereby ensuring a QoS of the service which is initiated by the second terminal device.

In some implementations, optionally, the method may further include the following after S306.

S307, the first terminal device provides the first QoS information to the second terminal device.

The first terminal device provides the first QoS information to the second terminal device, and it is possible to configure for the second terminal device the first QoS information that satisfies the end-to-end QoS requirement of the service, thereby ensuring a QoS of the service which is initiated by the second terminal device.

Figure 8:
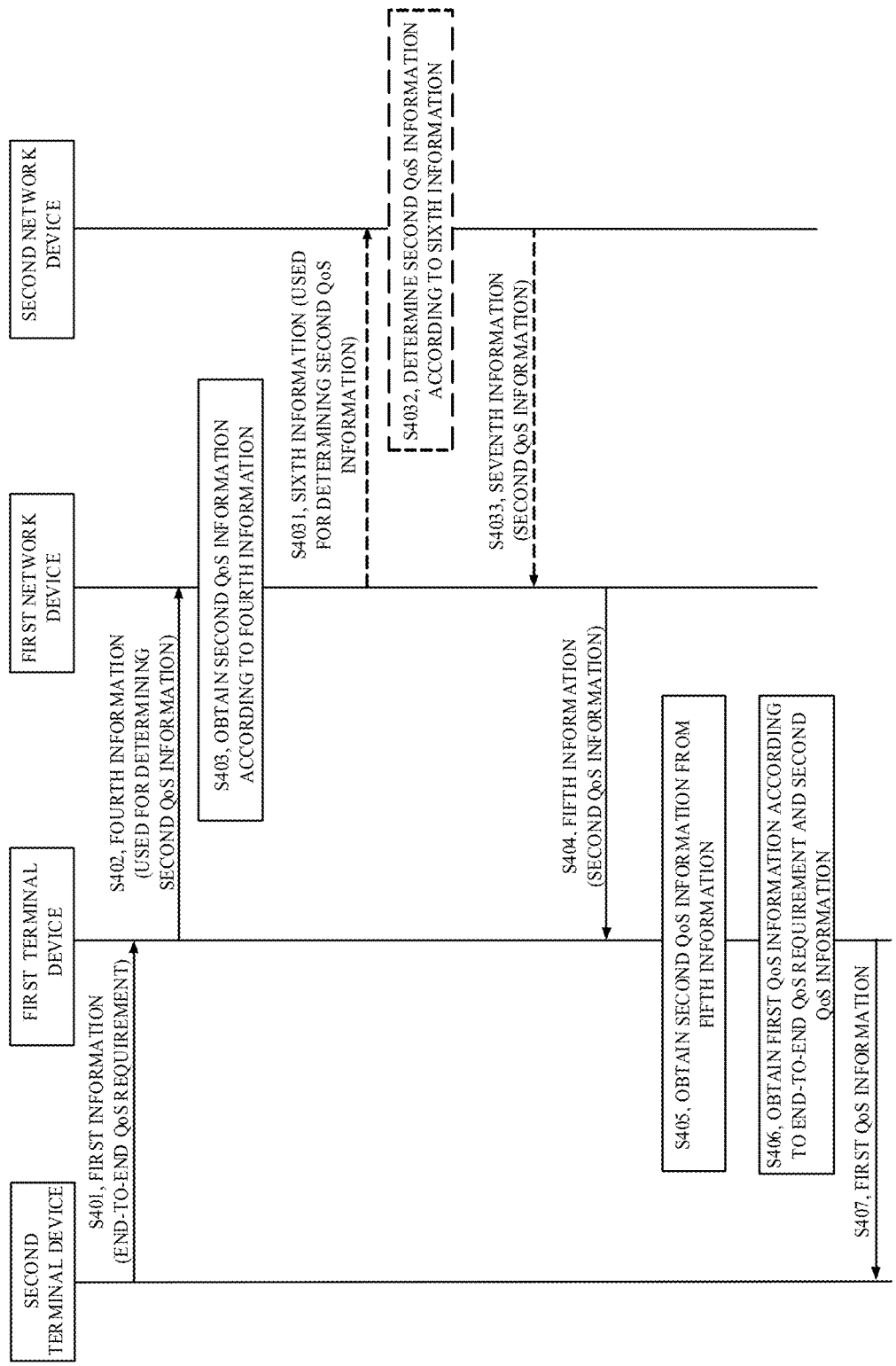
FIG. 8 is a flowchart of a method for QoS control provided in another implementation of the disclosure.

FIG. 8 is a flowchart of a method for QoS control provided in another implementation of the disclosure. As illustrated in FIG. 8, the method in this implementation includes the following.

S401, the second terminal device provides the first information to the first terminal device.

S401 in this implementation is similar to S101 in the implementation illustrated in FIG. 5. Reference can be made to elaborations of S101 in the implementation illustrated in FIG. 5, which will not be elaborated again herein.

S402, the first terminal device provides fourth information to a first network device according to the end-to-end QoS requirement.

Accordingly, the first network device receives the fourth information from the first terminal device. In this step, the fourth information is used for requesting to determine the second QoS information. The fourth information may include domain information of the data network, an ID of the data network, or slice information of the data network, etc.

S403, the first network device obtains the second QoS information according to the fourth information.

In a possible implementation, the first network device can obtain the second QoS information according to the fourth information and a pre-configured QoS control policy.

In another possible implementation, if a second network device that is responsible for policy control is deployed, the second network device can determine the second QoS information according to the fourth information and a pre-configured QoS control policy, and transmit the second QoS information determined to the first network device.

If the second QoS information is determined by the second network device, S4031~S4033 are performed after S402.

S4031, the first network device provides sixth information to the second network device. Accordingly, the second network device receives the sixth information from first network device.

In this step, the sixth information is used for requesting to determine the second QoS information. The sixth information may include information contained in second information.

S4032, the second network device determines the second QoS information according to the sixth information.

Specifically, the second network device determines the second QoS information according to the second information and a pre-configured QoS control policy.

S4033, the second network device provides seventh information to the first network device. Accordingly, the first network device receives the seventh information provided by the second network device and obtains the second QoS information from the seventh information.

The seventh information may include the second QoS information, or the seventh information may include indication information of the second QoS information.

It is to be noted that, the pre-configured QoS control policy involved in implementations may be determined by an operator according to factors such as service type, transmission resource, user priority, etc. There is no limitation on the pre-configured QoS control policy in implementations of the disclosure. In other words, there is no limitation on the manner in which the first network device or the second network device determines the second QoS information in implementations of the disclosure.

S404, the first network device provides fifth information to the first terminal device. Accordingly, the first terminal device receives the fifth information from the first network device.

The fifth information includes the second QoS information, or the fifth information includes indication information of the second QoS information.

S405, the first terminal device obtains the second QoS information from the fifth information.

S406, the first terminal device obtains the first QoS information according to the end-to-end QoS requirement and the second QoS information.

According to implementations of the disclosure, the first terminal device first receives the first information provided by the second terminal device, where the first information includes the end-to-end QoS requirement of the service which is initiated by the second terminal device and to be communicated to the data network via the first terminal device. According to the end-to-end QoS requirement, the first terminal device provides the first network device the fourth information used for determining the second QoS information. The first network device obtains and provides the second QoS information of communication between the first terminal device and the data network according to the fourth information. The first terminal device obtains the first QoS information according to the end-to-end QoS requirement and the second QoS information, where the end-to-end QoS requirement of the service is satisfied by the first QoS information and the second QoS information. According to the method in this implementation, it is possible to configure for the first terminal device the second QoS information that satisfies the end-to-end QoS requirement of the service, thereby ensuring a QoS of the service which is initiated by the second terminal device.

In some implementations, optionally, the method may further include the following after S406.

S407, the first terminal device provides the first QoS information to the second terminal device.

The first terminal device provides the first QoS information to the second terminal device, and it is possible to configure for the second terminal device the first QoS information that satisfies the end-to-end QoS requirement of the service, thereby ensuring a QoS of the service which is initiated by the second terminal device.

In a specific embodiment, the method for QoS control provided in the disclosure is described in detail in the case where the first terminal device is a relay UE, the second terminal device is a remote UE, the first network device is an SMF, and the second network device is a PCF. The relay UE and the remote UE may communicate with each other through a PC5 interface, and the remote UE may also communicate with the data network via the relay UE. For details of this scenario, reference can be made to elaborations of FIG. 3.

Figure 9:
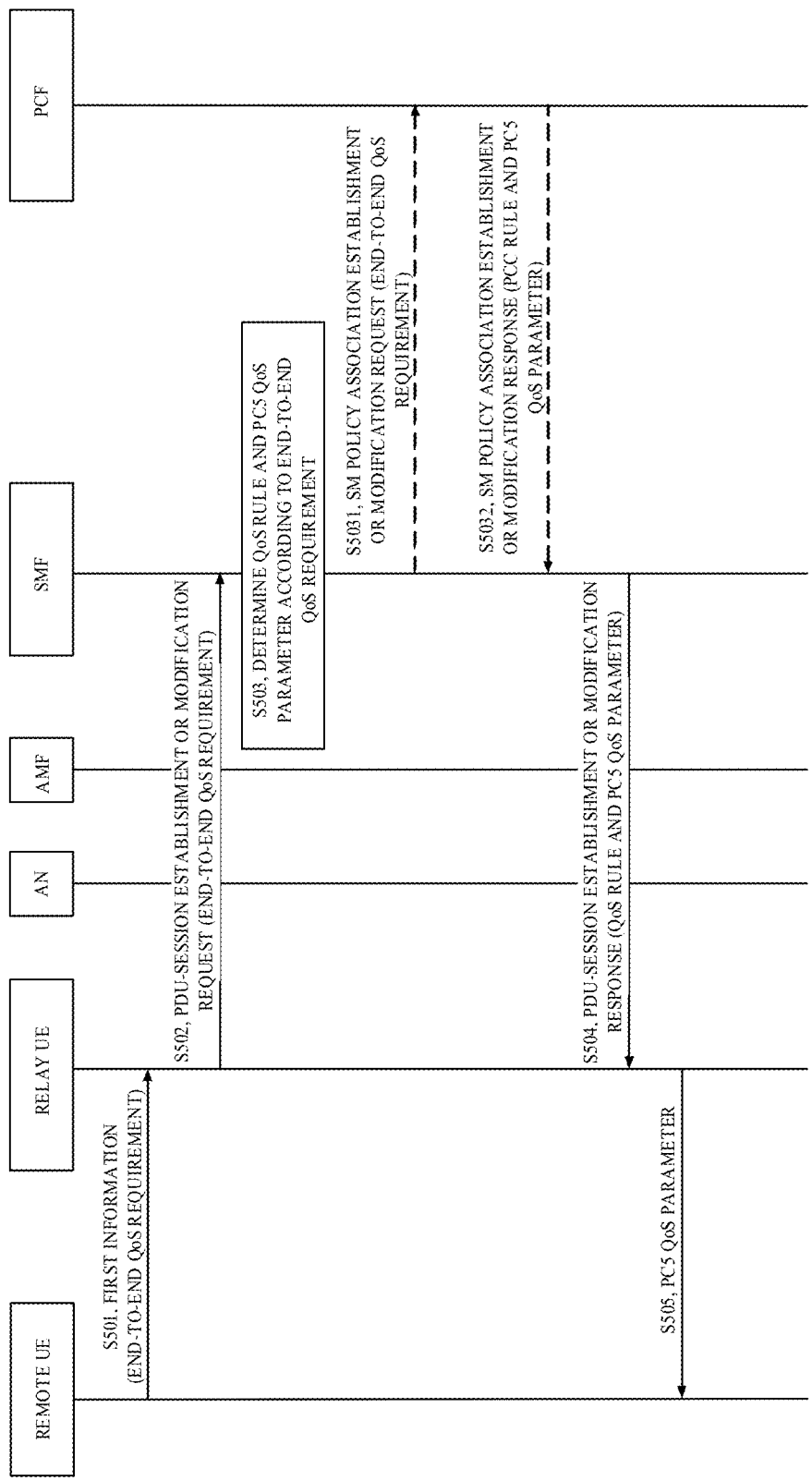
FIG. 9 is a flowchart of a method for QoS control provided in another implementation of the disclosure.

FIG. 9 is a flowchart of a method for QoS control provided in another implementation of the disclosure. As illustrated in FIG. 9, the method in this implementation includes the following.

S501, a remote UE provides first information to a relay UE. The first information includes an end-to-end QoS requirement.

Specifically, the remote UE first determines the end-to-end QoS requirement once triggered by an application. Then the remote UE provides a PC5-connection establishment or modification request to the relay UE, where the PC5-connection establishment or modification request may include an end-to-end QoS requirement of a service which is initiated by the remote UE and to be communicated to a data network via the relay UE. Exemplarily, the end-to-end QoS requirement includes, but is not limited to, parameters such as transmission delay, bit error rate, bandwidth, etc. Optionally, the end-to-end QoS requirement may include, for example, a PC5 5G QoS identifier (5QI) (PQI) value, where the PQI value indicates an end-to-end QoS requirement from the remote UE to the data network. It is to be noted that, the end-to-end QoS requirement may also be indicated by information other than the PQI value.

For example, if a PQI mapping table shown in table 1 below is pre-configured or standardized in a communication system, where PQI is used for a PC5 interface between the remote UE and the relay UE, the remote UE can provide PQI=95 to indicate an end-to-end QoS requirement with a transmission delay of 200 ms.

TABLE 1

| PQI | Priority | Delay | Bit error rate |
| --- | --- | --- | --- |
| 95 | 2 | 200 ms | $10^{-2}$ |

Optionally, the PC5-connection establishment or modification request may further include an ID of the service and/or an ID of the remote UE.

Accordingly, the relay UE receives the first information provided by the remote UE.

S502, the relay UE provides a PDU-session establishment or modification request to an SMF. The PDU-session establishment or modification request includes the end-to-end QoS requirement.

Accordingly, the SMF receives the PDU-session establishment or modification request from the relay UE.

In a practical communication system, as illustrated in FIG. 9, the PDU-session establishment or modification request provided by the relay UE is passed to the SMF through an AN and an AMF.

S503, the SMF determines a QoS rule and a PC5 QoS parameter according to the end-to-end QoS requirement.

The QoS rule is a QoS rule of a PDU session executed by the relay UE. The PC5 QoS parameter is a QoS parameter of a PC5 interface used for communication between the remote UE and the relay UE.

In some cases, if a PCF is deployed by an operator, S5031 and S5032 can be performed after S502.

S5031, the SMF provides a session management (SM) policy association establishment or modification request to the PCF. The SM policy association establishment or modification request includes the end-to-end QoS requirement.

Accordingly, the PCF receives the SM policy association establishment or modification request and obtains the end-to-end QoS requirement.

S5032, the PCF provides an SM policy association establishment or modification response to the SMF. The SM policy association establishment or modification response includes a PCC rule and the PC5 QoS parameter.

Specifically, the PCF may generate the PCC rule and the PC5 QoS parameter according to the end-to-end QoS requirement and a pre-configured QoS control policy. Then the PCC rule and the PC5 QoS parameter generated are provided to the SMF through the SM policy association establishment or modification response. The PCC rule can be used for determining the QoS rule, where the QoS rule is a QoS rule of a PDU session executed by the relay UE.

Exemplarily, a 5QI mapping table shown in table 2 below and a PQI mapping table shown in table 3 are pre-configured or standardized in a network. PQI is used for a PC5 interface between the remote UE and the relay UE. 5QI is used between the relay UE and a UPF, or the 5QI may be comprehended as being used between the relay UE and the data network. The PCC rule used for controlling data transmission between the relay UE and the UPF may include 5QI=66, or packet delay budget (PDB) may be directly set to 100 ms. The QoS parameter used for a PC5 interface may include PQI=58, or PC5 PDB may be directly set to 100 ms. PDB represents a delay.

TABLE 2

| 5QI | Priority level | Packet Delay Budget | Packet error rate |
|---|---|---|---|
| 66 | 20 | 100 ms | $10^{-2}$ |

TABLE 3

| PQI value | Priority level | Packet Delay Budget | Packet error rate |
|---|---|---|---|
| 58 | 4 | 100 ms | $10^{-2}$ |

Optionally, the PC5 QoS parameter and the PCC rule may be separately provided, or the PC5 QoS parameter may be carried in the PCC rule for transmission, and implementations of the disclosure are not limited in this regard.

It is to be noted that, no matter whether the manner in S503 above or the manner in S5031 and S5032 is adopted, the end-to-end QoS requirement described above is satisfied by the PC5 QoS parameter and the QoS rule included in the PCC rule, which is possible to ensure quality of data transmission between the remote UE and the data network.

S504, the SMF provides a PDU-session establishment or modification response to the relay UE. The PDU-session establishment or modification response includes the QoS rule and the PC5 QoS parameter.

The PC5 QoS parameter is a QoS parameter of a PC5 interface used for communication between the remote UE and the relay UE.

Accordingly, the relay UE receives the PDU-session establishment or modification response from the SMF, and obtains the QoS rule and the PC5 QoS parameter included in the PDU-session establishment or modification response. In a practical communication system, as illustrated in FIG. 9, the PDU-session establishment or modification response provided by the SMF is passed to the relay UE through the AN and the AMF.

The relay UE can control quality of data transmission between the relay UE and the data network according to the received QoS rule, that is, the relay UE can control quality of data transmission between the relay UE and the UPF according to the received QoS rule.

S505, the relay UE provides the PC5 QoS parameter to the remote UE.

Accordingly, the remote UE receives the PC5 QoS parameter provided by the relay UE. Then the remote UE can control quality of data transmission between the remote UE and the relay UE according to the received PC5 QoS parameter.

It is to be noted that, in a practical communication system, after determining the QoS rule and the PC5 QoS parameter, the SMF can further transmit the QoS rule to the AN, such that the AN determines, according to a communication resource condition, whether the QoS rule is satisfied. If the AN determines that a communication resource fails to satisfy the QoS rule, the AN can transmit indication information to the SMF, to indicate that the communication resource fails to satisfy the QoS rule. Once receiving the indication information provided by the AN, the SMF can redetermine the QoS rule and the PC5 QoS parameter according to the end-to-end QoS requirement, or the SMF requests the PCF to redetermine the QoS rule and the PC5 QoS parameter according to the end-to-end QoS requirement. The manner of redetermining the QoS rule and the PC5 QoS parameter above is similar to that in S503 and that in S5031 and S5032 and will not be elaborated again herein.

Figure 10:
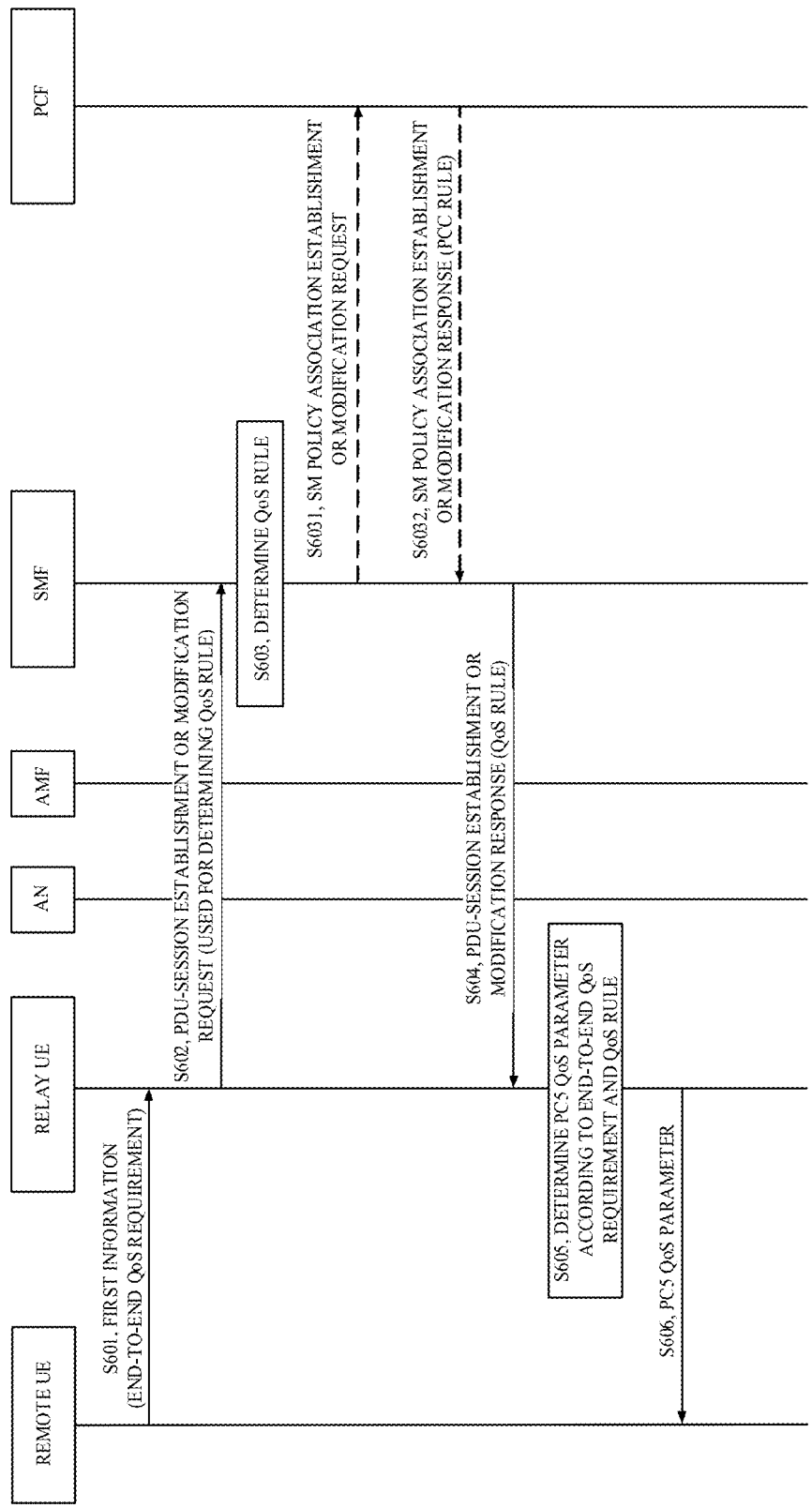
FIG. 10 is a flowchart of a method for QoS control provided in another implementation of the disclosure.

FIG. 10 is a flowchart of a method for QoS control provided in another implementation of the disclosure. As illustrated in FIG. 10, the method in this implementation includes the following.

S601, a remote UE provides first information to a relay UE. The first information includes an end-to-end QoS requirement.

Specifically, the remote UE first determines the end-to-end QoS requirement once triggered by an application. Then the remote UE provides a PC5-connection establishment or modification request to the relay UE, where the PC5-connection establishment or modification request may include an end-to-end QoS requirement of a service which is initiated by the remote UE and to be communicated to a data network via the relay UE. Exemplarily, the end-to-end QoS requirement includes, but is not limited to, parameters such as transmission delay, bit error rate, bandwidth, etc. Optionally, the end-to-end QoS requirement may include, for example, a PQI value, where the PQI value indicates an end-to-end QoS requirement from the remote UE to the data network. It is to be noted that, the end-to-end QoS requirement may also be indicated by information other than the PQI value.

Optionally, the PC5-connection establishment or modification request may further include an ID of the service and/or an ID of the remote UE.

Accordingly, the relay UE receives the first information provided by the remote UE.

S602, the relay UE provides a PDU-session establishment or modification request to an SMF.

In this implementation, the PDU-session establishment or modification request may include one or more of an ID of the data network, a domain of the data network, slice information of the data network, etc. The PDU-session establishment or modification request provided by the relay UE to the SMF is used for requesting a QoS rule used for determining the PDU session.

In a practical communication system, as illustrated in FIG. 10, the PDU-session establishment or modification request provided by the relay UE is passed to the SMF through an AN and an AMF.

Optionally, the PDU-session establishment or modification request may further include an ID of the service which is initiated by the remote UE and/or an ID of the remote UE.

S603, the SMF determines a QoS rule. The QoS rule is a QoS rule of a PDU session executed by the relay UE.

Optionally, the SMF can determine the QoS rule according to a pre-configured QoS control policy. Alternatively, the SMF can determine the QoS rule according to a pre-configured QoS control policy and the ID of the service and/or the ID of the remote UE.

In some cases, if a PCF is deployed by an operator, S6031 and S6032 can be performed after S602.

S6031, the SMF provides an SM policy association establishment or modification request to the PCF.

Optionally, the SM policy association establishment or modification request may include the ID of the service and/or the ID of the remote UE.

S6032, the PCF provides an SM policy association establishment or modification response to the SMF. The SM policy association establishment or modification response includes a PCC rule.

Specifically, the PCF may determine the QoS rule according to the pre-configured QoS control policy, or the PCF may determine the QoS rule according to the pre-configured QoS control policy and the ID of the service and/or the ID of the remote UE. Then the PCF provides a generated PCC rule to the SMF through the SM policy association establishment or modification response. The PCC rule can be used for determining a QoS rule, where the QoS rule is a QoS rule of a PDU session executed by the relay UE.

S604, the SMF provides a PDU-session establishment or modification response to a relay UE. The PDU-session establishment or modification response includes the QoS rule.

Accordingly, the relay UE receives the PDU-session establishment or modification response from the SMF, and obtains the QoS rule included in the PDU-session establishment or modification response. In a practical communication system, as illustrated in FIG. 10, the PDU-session establishment or modification response provided by the SMF is passed to the relay UE through the AN and the AMF.

The relay UE can control quality of data transmission between the relay UE and the data network according to the received QoS rule, that is, the relay UE can control quality of data transmission between the relay UE and a UPF according to the received QoS rule.

S605, the relay UE determines a PC5 QoS parameter according to the QoS rule and the end-to-end QoS requirement.

The end-to-end QoS requirement is satisfied by the PC5 QoS parameter determined by the relay UE and the QoS rule provided by the SMF.

For example, the end-to-end QoS requirement of the service which is initiated by the remote UE includes a transmission delay requirement, where the transmission delay requirement is 200 ms. The QoS rule provided by the SMF indicates that a transmission delay from the relay UE to the data network is 100 ms. In this case, the relay UE can determine that a transmission delay between the relay UE and the remote UE is 100 ms.

S606, the relay UE provides the PC5 QoS parameter to the remote UE.

Accordingly, the remote UE receives the PC5 QoS parameter provided by the relay UE. Then the remote UE can control quality of data transmission between the remote UE and the relay UE according to the received PC5 QoS parameter. Similar to the above implementations, the relay UE can transmit a PQI value to the remote UE to indicate a QoS parameter of a PC5 interface, or the QoS parameter of the PC5 interface can be directly provided.

It is to be noted that, in a practical communication system, after determining the QoS rule and the PC5 QoS parameter, the SMF can further transmit the QoS rule to the AN, such that the AN determines, according to a communication resource condition, whether the QoS rule is satisfied. If the AN determines that a communication resource fails to satisfy the QoS rule, the AN can transmit indication information to the SMF, to indicate that the communication resource fails to satisfy the QoS rule. Once receiving the indication information provided by the AN, the SMF can redetermine the QoS rule and the PC5 QoS parameter according to the end-to-end QoS requirement, or the SMF requests the PCF to redetermine the QoS rule and the PC5 QoS parameter according to the end-to-end QoS requirement. The manner of redetermining the QoS rule and the PC5 QoS parameter above is similar to that in S503 and that in S5031 and S5032 and will not be elaborated again herein.

Figure 11:
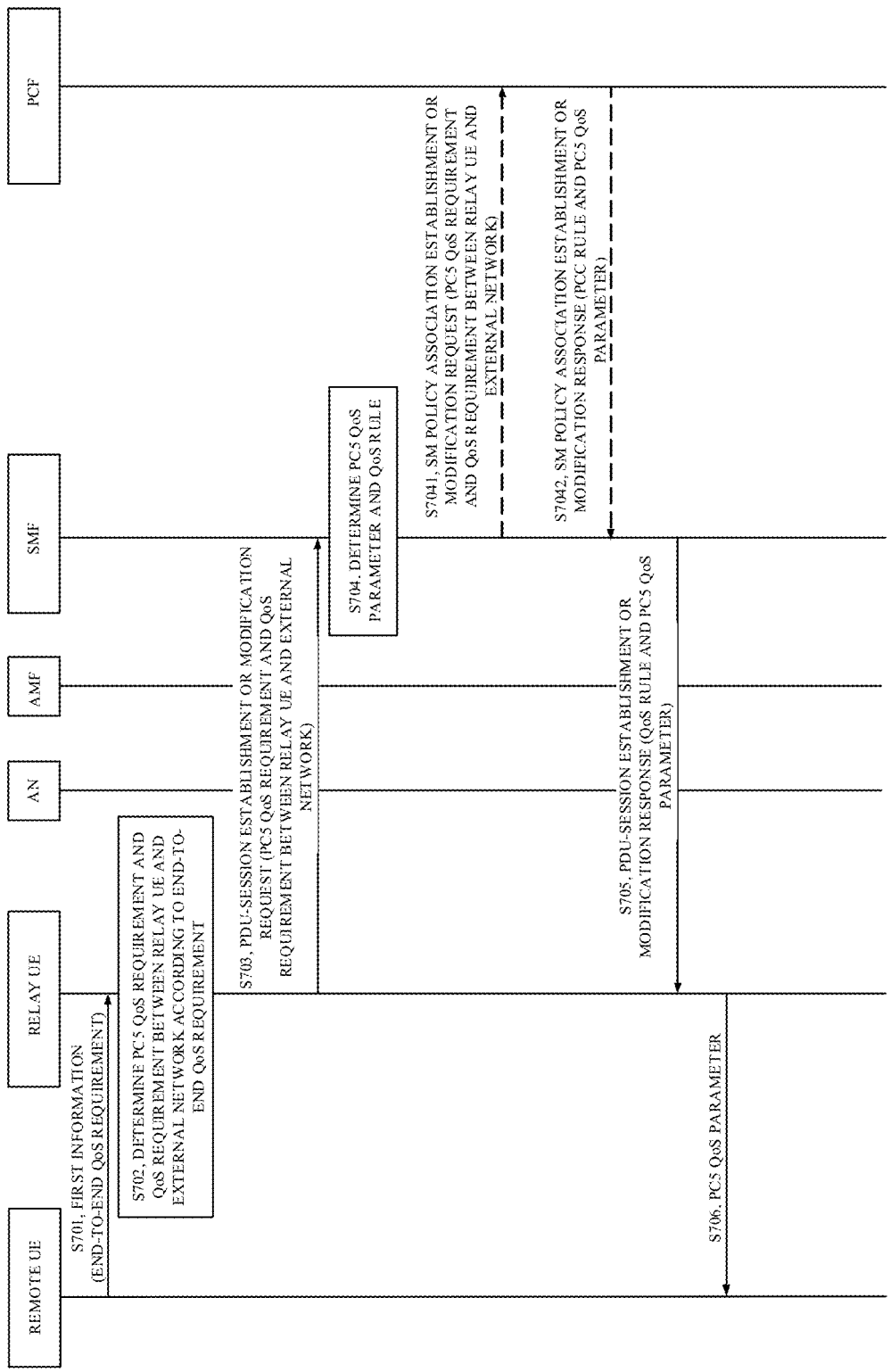
FIG. 11 is a flowchart of a method for QoS control provided in another implementation of the disclosure.

FIG. 11 is a flowchart of a method for QoS control provided in another implementation of the disclosure. As illustrated in FIG. 11, the method in this implementation includes the following.

S701, a remote UE provides first information to a relay UE. The first information includes an end-to-end QoS requirement.

Specifically, the remote UE first determines the end-to-end QoS requirement once triggered by an application. Then the remote UE provides a PC5-connection establishment or modification request to the relay UE, where the PC5-connection establishment or modification request may include an end-to-end QoS requirement of a service which is initiated by the remote UE and to be communicated to a data network via the relay UE. Exemplarily, the end-to-end QoS requirement includes, but is not limited to, parameters such as transmission delay, bit error rate, bandwidth, etc. Optionally, the end-to-end QoS requirement may include, for example, a PQI value, where the PQI value indicates an end-to-end QoS requirement from the remote UE to the data network. It is to be noted that, the end-to-end QoS requirement may also be indicated by information other than the PQI value.

Accordingly, the relay UE receives the first information provided by the remote UE.

S702, the relay UE determines a PC5 QoS requirement and a QoS requirement between the relay UE and the data network according to the end-to-end QoS requirement.

The PC5 QoS requirement referred to herein is a QoS requirement between the remote UE and the relay UE.

S703, the relay UE provides a PDU-session establishment or modification request to an SMF.

In this implementation, the PDU-session establishment or modification request may include the PC5 QoS requirement and the QoS requirement between the relay UE and the data network determined in S702. The PDU-session establishment or modification request provided by the relay UE to the SMF is used for requesting the SMF to authorize the PC5 QoS requirement and the QoS requirement between the relay UE and the data network obtained in S702.

In a practical communication system, as illustrated in FIG. 11, the PDU-session establishment or modification request provided by the relay UE is passed to the SMF through an AN and an AMF.

S704, the SMF determines a PC5 QoS parameter and a QoS rule.

The SMF may determine the PC5 QoS parameter and the QoS rule according to a pre-configured QoS control policy. The QoS rule is a QoS rule of a PDU session executed by the relay UE. The PC5 QoS parameter is a QoS parameter of a PC5 interface used for communication between the remote UE and the relay UE.

In some cases, if a PCF is deployed by an operator, S7041 and S7042 can be performed after S702.

S7041, the SMF provides an SM policy association establishment or modification request to the PCF.

Optionally, the SM policy association establishment or modification request may include the PC5 QoS requirement and the QoS requirement between the relay UE and the data network.

S7042, the PCF provides an SM policy association establishment or modification response to the SMF. The SM policy association establishment or modification response includes a PCC rule and a PC5 QoS parameter.

Specifically, the PCF can determine the PCC rule and the PC5 QoS parameter according to the pre-configured QoS control policy. The PCC rule can be used for determining a QoS rule, where the QoS rule is a QoS rule of a PDU session executed by the relay UE.

S705, the SMF provides a PDU-session establishment or modification response to the relay UE. The PDU-session establishment or modification response includes the PC5 QoS parameter and the QoS rule.

Accordingly, the relay UE receives the PDU-session establishment or modification response from the SMF, and obtains the PC5 QoS parameter and the QoS rule included in the PDU-session establishment or modification response. In a practical communication system, as illustrated in FIG. 11, the PDU-session establishment or modification response provided by the SMF is passed to the relay UE through the AN and the AMF.

The relay UE can control quality of data transmission between the relay UE and the data network according to the received QoS rule, that is, the relay UE can control quality of data transmission between the relay UE and a UPF according to the received QoS rule.

S706, the relay UE provides the PC5 QoS parameter to the remote UE.

Accordingly, the remote UE receives the PC5 QoS parameter provided by the relay UE. Then the remote UE can control quality of data transmission between the remote UE and the relay UE according to the received PC5 QoS parameter.

It is to be noted that, in a practical communication system, after determining the QoS rule and the PC5 QoS parameter, the SMF can further transmit the QoS rule to the AN, such that the AN determines, according to a communication resource condition, whether the QoS rule is satisfied. If the AN determines that a communication resource fails to satisfy the QoS rule, the AN can transmit indication information to the SMF, to indicate that the communication resource fails to satisfy the QoS rule. Once receiving the indication information provided by the AN, the SMF can redetermine the QoS rule and the PC5 QoS parameter according to the end-to-end QoS requirement, or the SMF requests the PCF to redetermine the QoS rule and the PC5 QoS parameter according to the end-to-end QoS requirement. The manner of redetermining the QoS rule and the PC5 QoS parameter above is similar to that in S503 and that in S5031 and S5032 and thus will not be elaborated again herein.

Figure 12:
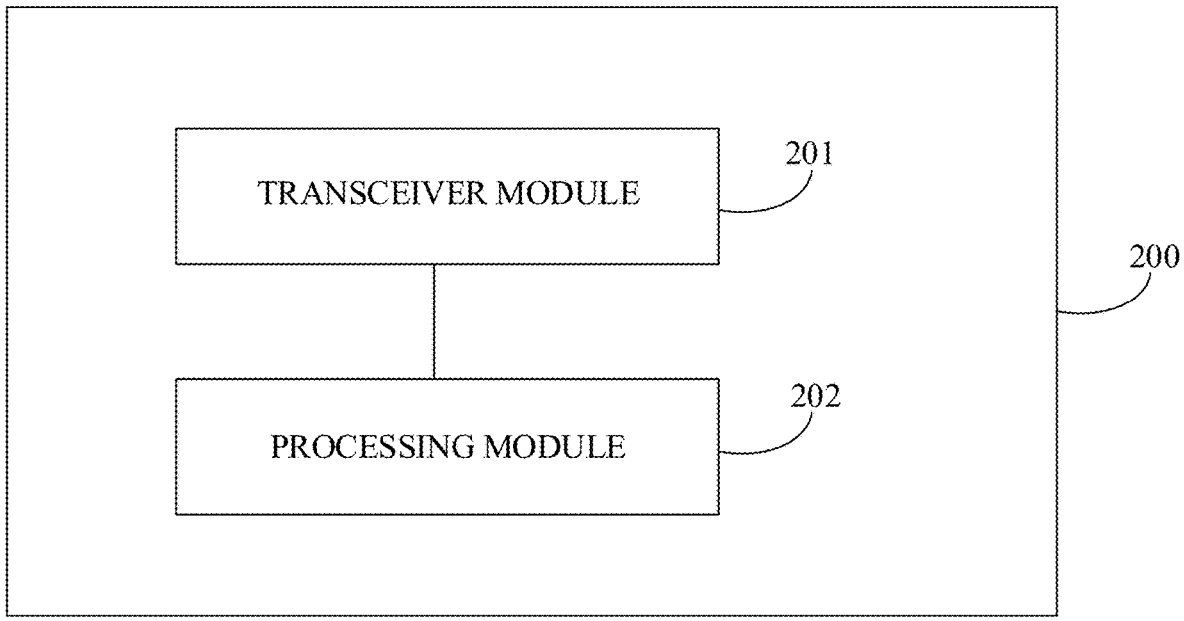
FIG. 12 is a schematic structural diagram of a terminal device provided in an implementation of the disclosure.

FIG. 12 is a schematic structural diagram of a terminal device provided in an implementation of the disclosure. The terminal device 200 provided in this implementation of the disclosure may be the first terminal device in the foregoing implementations or part of the first terminal device. Refer to FIG. 12, the terminal device 200 in this implementation includes a transceiver module 201 and a processing module 202. The transceiver module 201 is configured to receive first information from a second terminal device, where the first information includes an end-to-end QoS requirement of a service which is initiated by the second terminal device and to be communicated to a data network via the first terminal device. The processing module 202 is configured to obtain first QoS information and second QoS information. The first QoS information is QoS information of communication between the first terminal device and the second terminal device, the second QoS information is QoS information of communication between the first terminal device and the data network, and the end-to-end QoS requirement is satisfied by the first QoS information and the second QoS information.

The terminal device provided in this implementation may be configured to implement technical solutions at the first-terminal-device side in any of the foregoing method implementations. The implementation principles and technical effects thereof are similar and will not be elaborated again herein.

In some possible designs, the transceiver module 201 is further configured to transmit the first QoS information to the second terminal device.

In some possible designs, the first QoS information and the second QoS information are obtained by the processing module 202 according to third information provided by a first network device, and the third information indicates the first QoS information and the second QoS information.

In some possible designs, the third information includes the first QoS information and the second QoS information, or the third information includes indication information of the first QoS information and indication information of the second QoS information.

In some possible designs, the transceiver module 201 is further configured to transmit second information to the first network device according to the end-to-end QoS requirement, where the second information is used for determining the first QoS information and the second QoS information.

In some possible designs, the second information includes the end-to-end QoS requirement.

In some possible designs, the second information includes a first QoS requirement and a second QoS requirement. The first QoS requirement is a QoS requirement of communication between the first terminal device and the second terminal device determined by the first terminal device according to the end-to-end QoS requirement, and the second QoS requirement is a QoS requirement of communication between the first terminal device and the data network determined by the first terminal device according to the end-to-end QoS requirement.

In some possible designs, the second information further includes an ID of the service and/or an ID of the second terminal device. The ID of the service is used for determining the first QoS information and the second QoS information, and the ID of the second terminal device is used for determining the first QoS information and the second QoS information.

In some possible designs, the first QoS information is determined by the processing module 202 according to the end-to-end QoS requirement and fifth information provided by a first network device, and the fifth information includes the second QoS information.

In some possible designs, the transceiver module 201 is further configured to transmit fourth information to the first network device according to the end-to-end QoS requirement, where the fourth information is used for determining the second QoS information.

In some possible designs, the fourth information further includes an ID of the service and/or an ID of the second terminal device, and the ID of the service and/or the ID of the second terminal device is used for determining the second QoS information.

In some possible designs, the first information further includes an ID of the service and/or an ID of the second terminal device. The ID of the service is used for determining the first QoS information and the second QoS information, and the ID of the second terminal device is used for determining the first QoS information and the second QoS information.

Figure 13:
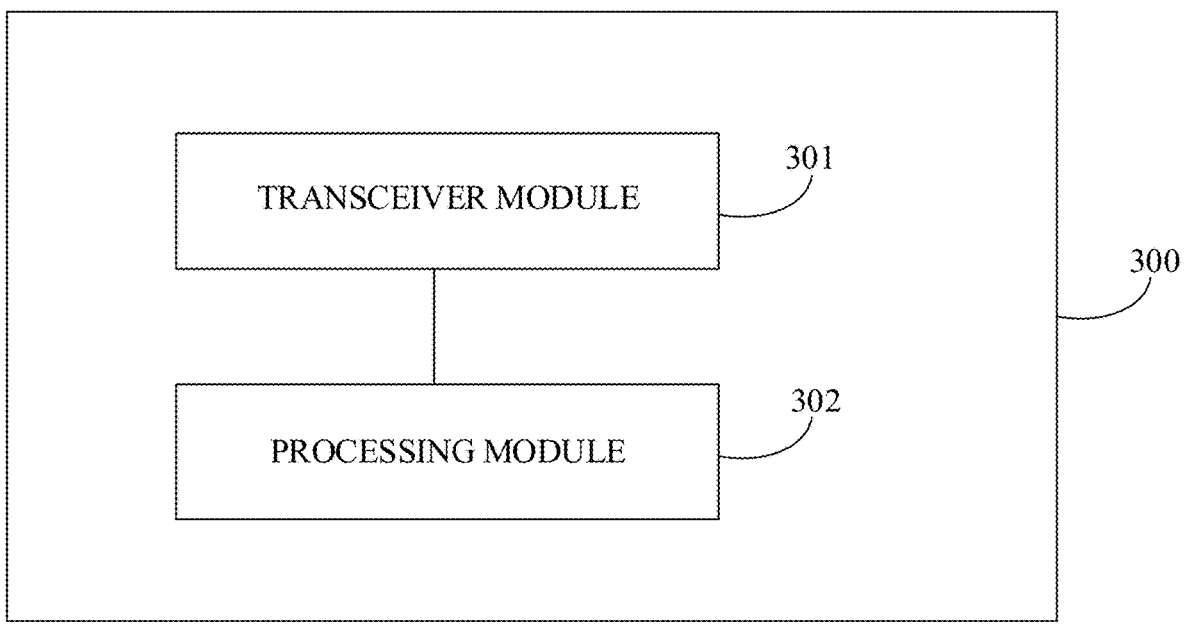
FIG. 13 is a schematic structural diagram of a terminal device provided in another implementation of the disclosure.

FIG. 13 is a schematic structural diagram of a terminal device provided in another implementation of the disclosure. The terminal device 300 provided in this implementation may be the second terminal device in the foregoing implementations or part of the second terminal device. Refer to FIG. 13, the terminal device 300 in this implementation includes a transceiver module 301 and a processing module 302. The transceiver module 301 is configured to transmit first information to a first terminal device, where the first information includes an end-to-end QoS requirement of a service which is initiated by the second terminal device and to be communicated to a data network via the first terminal device. The transceiver module 301 is further configured to receive first QoS information from the first terminal device. The processing module 302 is configured to obtain the first QoS information from information received. The first QoS information is QoS information of communication between the first terminal device and the second terminal device.

The second terminal device provided in this implementation may be configured to implement technical solutions at the second-terminal-device side in any of the foregoing method implementations. The implementation principles and technical effects thereof are similar and will not be elaborated again herein.

In some possible designs, the first QoS information is obtained by the first terminal device according to third information provided by a first network device, where the third information indicates the first QoS information and second QoS information. The second QoS information is QoS information of communication between the first terminal device and the data network. The end-to-end QoS requirement is satisfied by the first QoS information and the second QoS information.

In some possible designs, the third information includes the first QoS information and the second QoS information, or the third information includes indication information of the first QoS information and indication information of the second QoS information.

In some possible designs, the first QoS information is determined by the first terminal device according to the end-to-end QoS requirement and fifth information provided by the first network device, where the fifth information includes the second QoS information.

In some possible designs, the first information further includes an ID of the service and/or an ID of the second terminal device. The ID of the service is used for determining the first QoS information and the second QoS information, and the ID of the second terminal device is used for determining the first QoS information and the second QoS information.

Figure 14:
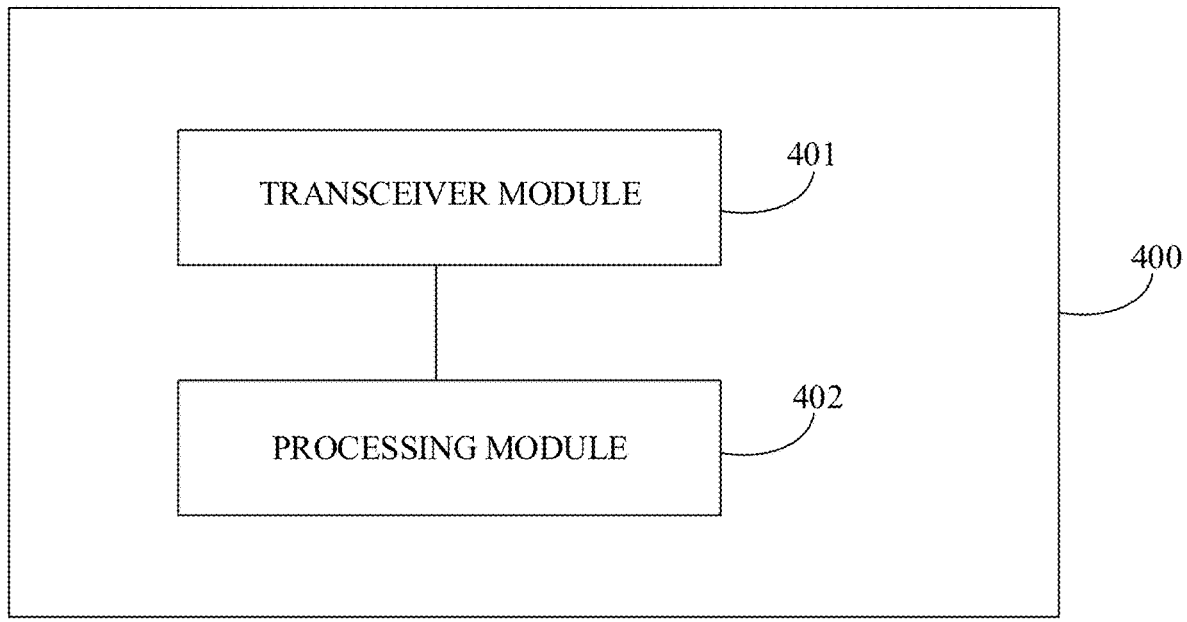
FIG. 14 is a schematic structural diagram of a network device provided in an implementation of the disclosure.

FIG. 14 is a schematic structural diagram of a network device provided in an implementation of the disclosure. The network device 400 provided in this implementation may be the first network device in the foregoing implementations or part of the first network device. Refer to FIG. 14, the network device 400 in this implementation includes a transceiver module 401 and a processing module 402. The transceiver module 401 is configured to receive information used for determining second QoS information and provided by a first terminal device according to an end-to-end QoS requirement, where the end-to-end QoS requirement is an end-to-end QoS requirement of a service which is initiated by a second terminal device and to be communicated to a data network via the first terminal device. The processing module 402 is configured to obtain the second QoS information according to the information used for determining the second QoS information, where the second QoS information is QoS information of communication between the first terminal device and the data network. The transceiver module 401 is further configured to transmit information indicative of the second QoS information to the first terminal device.

The network device provided in this implementation may be configured to implement technical solutions at the first-network-device side in any of the foregoing method implementations. The implementation principles and technical effects thereof are similar and will not be elaborated again herein.

In some possible designs, the information used for determining the second QoS information and provided by the first terminal device according to the end-to-end QoS requirement further includes an ID of the service and/or an ID of the second terminal device, where the ID of the service and/or the ID of the second terminal device is used for determining the second QoS information.

In some possible designs, the transceiver module 401 is further configured to transmit the information used for determining the second QoS information to a second network device, and receive the information indicative of the second QoS information provided by the second network device. The processing module 402 is specifically configured to obtain the second QoS information from the received information indicative of the second QoS information.

In some possible designs, the information used for determining the second QoS information and provided by the first terminal device according to the end-to-end QoS requirement is further used for determining first QoS information, where the first QoS information is QoS information of communication between the first terminal device and the second terminal device, and the end-to-end QoS requirement is satisfied by the first QoS information and the second QoS information.

In some possible designs, information used for determining the first QoS information and the second QoS information and provided by the first terminal device according to the end-to-end QoS requirement includes the end-to-end QoS requirement.

In some possible designs, information used for determining the first QoS information and the second QoS information and provided by the first terminal device according to the end-to-end QoS requirement includes a first QoS requirement and a second QoS requirement. The first QoS requirement is a QoS requirement of communication between the first terminal device and the second terminal device determined by the first terminal device according to the end-to-end QoS requirement, and the second QoS requirement is a QoS requirement of communication between the first terminal device and the data network determined by the first terminal device according to the end-to-end QoS requirement.

In some possible designs, the processing module 402 is specifically configured to obtain the first QoS information from the second network device. The transceiver module 401 is further configured to transmit information indicative of the first QoS information to the first terminal device.

In some possible designs, the information used for determining the first QoS information and the second QoS information and provided by the first terminal device according to the end-to-end QoS requirement further includes an ID of the service and/or an ID of the second terminal device. The ID of the service is used for determining the first QoS information and the second QoS information, and the ID of the second terminal device is used for determining the first QoS information and the second QoS information.

In some possible designs, the transceiver module 401 is specifically configured to transmit information used for determining the first QoS information to the second network device, and receive information indicative of the first QoS information provided by the second network device. The processing module 402 is specifically configured to obtain the first QoS information from the received information indicative of the first QoS information.

In some possible designs, the information used for determining the first QoS information and provided by the transceiver module 401 to the second network device includes the end-to-end QoS requirement.

In some possible designs, the information used for determining the first QoS information and provided by the transceiver module 401 to the second network device further includes an ID of the service and/or an ID of the second terminal device. The ID of the service is used for determining the first QoS information and the second QoS information, and the ID of the second terminal device is used for determining the first QoS information and the second QoS information.

Figure 15:
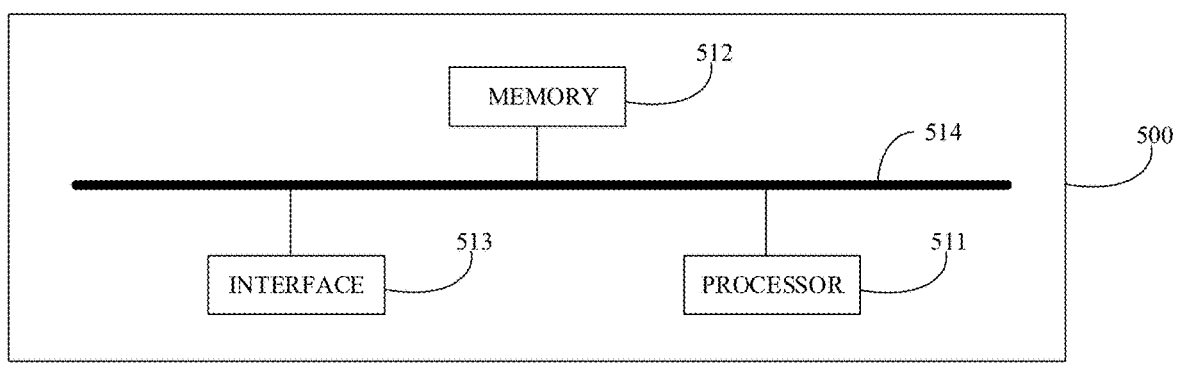
FIG. 15 is a schematic structural diagram of an electronic device provided in an implementation of the disclosure.

FIG. 15 is a schematic structural diagram of an electronic device provided in an implementation of the disclosure. As illustrated in FIG. 15, the electronic device 500 includes a processor 511, a memory 512, and an interface 513 configured for communication with a network device. The memory 512 is configured to store computer executable instructions. The processor 511 is configured to execute the computer executable instructions stored in the memory 512, to perform the technical solutions at the first-terminal-device side, or at second-terminal-device side, or at the first-network-device side, or at the second-network-device side in any of the foregoing method implementations.

FIG. 15 is a simple design of the electronic device. There is no limitation on the number of processors and memories of the electronic device in implementations of the disclosure. FIG. 15 only takes the number of 1 as an example for illustration.

In a specific implementation of the electronic device illustrated in FIG. 15, the memory, the processor, and the interface may be coupled via a bus 514. Optionally, the memory may be integrated into the processor.

Implementations of the disclosure further provide a computer-readable storage medium. The computer-readable storage medium is configured to store computer executable instructions which, when executed by a processor, are operable with the processor to perform the technical solutions at the first-terminal-device side, or at the second-terminal-device side, or at the first-network-device side, or at the second-network-device side in any of the foregoing method implementations.

Implementations of the disclosure further provide a computer-readable storage medium. The computer-readable storage medium is configured to store computer executable instructions which, when executed by a processor, are operable with the processor to perform the technical solutions at the first-terminal-device side, or at the second-terminal-device side, or at the first-network-device side, or at the second-network-device side in any of the foregoing method implementations.

Implementations of the disclosure further provide a program. The program, when executed by a processor, is operable with the processor to perform the technical solutions at the first-terminal-device side, or at the second-terminal-device side, or at the first-network-device side, or at the second-network-device side in any of the foregoing method implementations.

Optionally, the processor described above may be a chip.

Implementations of the disclosure further provide a computer program product. The computer program product includes program instructions. The program instructions implement the technical solutions at the first-terminal-device side, or at the second-terminal-device side, or at the first-network-device side, or at the second-network-device side in any of the foregoing method implementations.

Implementations of the disclosure further provide a chip. The chip includes a processing module and a communication interface. The processing module can be configured to perform the technical solutions at the first-terminal-device side, or at the second-terminal-device side, or at the first-network-device side, or at the second-network-device side in any of the foregoing method implementations.

In addition, the chip further includes a storage module (such as memory). The storage module is configured to store instructions. The processing module is configured to execute the instructions stored in the storage module, and execution of the instructions stored in the storage module makes the processing module perform the technical solutions at the first-terminal-device side, or at the second-terminal-device side, or at the first-network-device side, or at the second-network-device side in any of the foregoing method implementations.

In implementations provided in the disclosure, it will be appreciated that the devices and methods disclosed may also be implemented in other manners. For example, the device implementations described above are merely illustrative, e.g., the division of modules is only a division of logical functions, and other manners of division may be available in practice, e.g., multiple modules may be combined or may be integrated into another system, or some features may be ignored or skipped. In other respects, the coupling or direct coupling or communication connection as illustrated or discussed may be an indirect coupling or communication connection through some interface or module, and may be electrical, mechanical, or otherwise.

In specific implementations of the terminal devices and the network devices described above, it should be understood that, the processor may be a central processing unit (CPU), or may be other general-purpose processors, digital signal processors (DSP), application specific integrated circuits (ASIC), etc. The general purpose processor may be a microprocessor, or the processor may also be any conventional processor or the like. The steps of the method disclosed in the disclosure may be directly implemented by a hardware processor, or may be performed by hardware and software modules in the processor.

Some or all of the steps for implementing the various method implementations above may be completed by program-instruction-related hardware. The programs described above can be stored in a readable memory. The programs, when executed, execute the steps of the various method implementations above. The memory (storage medium) described above includes a read-only memory (ROM), a random access memory (RAM), a flash memory, a hard disk, a solid state drive, a magnetic tape, a floppy disk, an optical disc, and any combination thereof

What is claimed is:

1. A method for quality of service (QoS) control, comprising:
receiving, by a first terminal device, first information from a second terminal device, the first information comprising an end-to-end QoS requirement of a service which is initiated by the second terminal device and to be communicated to a data network via the first terminal device; and
obtaining, by the first terminal device, first QoS information and second QoS information, the first QoS information being QoS information of communication between the first terminal device and the second terminal device, the second QoS information being QoS information of communication between the first terminal device and the data network, and the end-to-end QoS requirement being satisfied by the first QoS information and the second QoS information.

2. The method of claim 1, further comprising:
providing, by the first terminal device, the first QoS information to the second terminal device.

3. The method of claim 1, wherein the end-to-end QoS requirement comprises a PC5 5G QoS identifier (PQI) value.

4. The method of claim 1, wherein the first QoS information is determined by the first terminal device according to the end-to-end QoS requirement and fifth information provided by a first network device, and the fifth information comprises the second QoS information.

5. The method of claim 4, further comprising:
providing, by the first terminal device, fourth information to the first network device according to the end-to-end QoS requirement, wherein the fourth information is used for determining the second QoS information.

6. The method of claim 1, wherein the first information further comprises an ID of the service and/or an ID of the second terminal device;
wherein the ID of the service is used for determining the first QoS information and the second QoS information, and the ID of the second terminal device is used for determining the first QoS information and the second QoS information.

7. A method for quality of service (QoS) control, comprising:
providing, by a second terminal device, first information to a first terminal device, the first information comprising an end-to-end QoS requirement of a service which is initiated by the second terminal device and to be communicated to a data network via the first terminal device; and
receiving, by the second terminal device, first QoS information from the first terminal device, the first QoS information being QoS information of communication between the first terminal device and the second terminal device.

8. The method of claim 7, wherein the first QoS information is determined by the first terminal device according to the end-to-end QoS requirement and fifth information provided by a first network device, wherein the fifth information comprises second QoS information.

9. A method for quality of service (QoS) control, comprising:

receiving, by a first network device, information used for determining second QoS information and provided by a first terminal device according to an end-to-end QoS requirement, the end-to-end QoS requirement being an end-to-end QoS requirement of a service which is initiated by a second terminal device and to be communicated to a data network via the first terminal device;
obtaining, by the first network device, the second QoS information according to the information used for determining the second QoS information, the second QoS information being QoS information of communication between the first terminal device and the data network; and
providing, by the first network device, information indicative of the second QoS information to the first terminal device.

10. The method of claim 9, wherein obtaining, by the first network device, the second QoS information according to the information used for determining the second QoS information comprises:
providing, by the first network device, the information used for determining the second QoS information to a second network device; and
receiving, by the first network device, the information indicative of the second QoS information provided by the second network device.

11. A terminal device, being operable as a first terminal device, comprising:
a transceiver and a processor, configured to implement the method of claim 1.

12. The terminal device of claim 11, wherein the transceiver configured to:
transmit the first QoS information to the second terminal device.

13. The terminal device of claim 11, wherein the end-to-end QoS requirement comprises a PC5 5G QoS identifier (PQI) value.

14. The terminal device of claim 11, wherein the first QoS information is determined by the processor according to the end-to-end QoS requirement and fifth information provided by a first network device, and the fifth information comprises the second QoS information.

15. The terminal device of claim 14, wherein the transceiver is configured to:
transmit fourth information to the first network device according to the end-to-end QoS requirement, wherein the fourth information is used for determining the second QoS information.

16. A terminal device, being operable as a second terminal device, comprising:
a transceiver configured to implement the method of claim 7.

17. The terminal device of claim 16, wherein the first QoS information is determined by the first terminal device according to the end-to-end QoS requirement and fifth information provided by the first network device, wherein the fifth information comprises the second QoS information.

18. A network device, being operable as a first network device, comprising a transceiver and a processor and configured to implement the method of claim 9.

19. The network device of claim 18, wherein:
the transceiver is further configured to:
transmit the information used for determining the second QoS information to a second network device; and receive the information indicative of the second QoS information provided by the second network device; and the processor is configured to:
obtain the second QoS information from the received information indicative of the second QoS information.

20. The network device of claim 18, wherein the information used for determining the second QoS information and provided by the first terminal device according to the end-to-end QoS requirement is further used for determining first QoS information;
  wherein the first QoS information is QoS information of communication between the first terminal device and the second terminal device, and the end-to-end QoS requirement is satisfied by the first QoS information and the second QoS information.

* * * * *